(12) United States Patent
Oikawa et al.

(10) Patent No.: US 8,455,596 B2
(45) Date of Patent: Jun. 4, 2013

(54) METHOD FOR PRODUCING A COPOLYMER FOR PHOTORESIST

(75) Inventors: Tomo Oikawa, Ichihara (JP); Eiichi Ikawa, Ichihara (JP)

(73) Assignee: Maruzen Petrochemical Co., Ltd., Chuo-Ku (JP)

( * ) Notice: Subject to any disclaimer, the term of this patent is extended or adjusted under 35 U.S.C. 154(b) by 544 days.

(21) Appl. No.: 12/702,356

(22) Filed: Feb. 9, 2010

(65) Prior Publication Data

US 2010/0222526 A1 Sep. 2, 2010

(30) Foreign Application Priority Data

Feb. 27, 2009 (JP) ................................ 2009-046851

(51) Int. Cl.
*C08F 2/00* (2006.01)

(52) U.S. Cl.
USPC ................ 526/87; 526/50; 526/59; 526/66; 526/78

(58) Field of Classification Search
USPC .................................... 526/59, 50, 66, 78, 87
See application file for complete search history.

(56) References Cited

U.S. PATENT DOCUMENTS

| 6,828,393 B1 * | 12/2004 | Austin et al. .................... 526/87 |
| 2009/0076230 A1 * | 3/2009 | Sheehan et al. ................. 526/60 |
| 2010/0048848 A1 * | 2/2010 | Yamagishi et al. ........... 526/266 |

FOREIGN PATENT DOCUMENTS

| JP | 11-295894 A1 | 10/1999 |
| JP | 2003-246825 A1 | 9/2003 |
| WO | WO 2008078410 A1 * | 7/2008 |

* cited by examiner

*Primary Examiner* — Karuna P Reddy
(74) *Attorney, Agent, or Firm* — Burr & Brown

(57) ABSTRACT

The present invention provides a method for production of a copolymer for photoresists in which the bias of the monomer composition ration is small. This method for production is a method for production of a copolymer for photoresists, which copolymer containing at least two types of repeating units, the method having a supplying step of supplying a monomer solution and a solution containing a polymerization initiator into a polymerization reaction system, wherein the range of fluctuation of the monomer composition ratio of unreacted monomers is within the range between minus 15% and plus 15% or the standard deviation of the monomer composition ratio of unreacted monomers is within 2 in the polymerization reaction system during the period from the start of the polymerization reaction to the end of supplying of the monomer solution.

13 Claims, 2 Drawing Sheets

METHOD FOR PRODUCING A COPOLYMER FOR PHOTORESIST

TECHNICAL FIELD

The present invention relates to: a method of producing a photoresist material, photoresist composition and polymer useful as base polymer thereof, which are suitably used in an ultra-fine photolithography process and other photo-fabrication processes such as microfabrication technique in the production step of semiconductor elements and the production of VLSIs and high capacity microchips; and a photoresist material and photoresist composition obtained by the method.

BACKGROUND ART

In the field of the microfabrication represented by the production of semiconductor integrated devices such as VLSI, due to a trend of ultra high integration of an integrated circuit, ultrafine pattern formation in a range of submicron to quarter micron is demanded. Along with this, with regard also to a exposure wavelength, in order to obtain a higher degree of integration by the g-line to the i-line, a light source with wavelength shorter than an ArF excimer laser (wavelength 193 nm), a F2 excimer laser (wavelength 157 nm), or the like is now used. In addition, by combining with a technology such as immersion lithography, a lithography technology capable of the microfabricating at the level of about 50 nm or less is required. In a base polymer used for a radiosensitive resin composition suitable for photolithography by such excimer lasers, more advanced qualities such as control of molecular weight and molecular weight distribution (for example, see Patent Document 1); stability; homogeneity of distribution of copolymer composition; and reduction of ultrahigh molecular weight components, low molecular weight components and an amount of other impurities, are demanded due to development of miniaturization.

Meanwhile, in the production of a polymer, a composition of a polymer to be generated may be biased due to a difference in the reaction mode. The polymer with the biased composition is produced because the polymerization reaction rate of each of several types of raw material monomers varies. In the reaction mode of the batch style (lumped style) in which the monomers are allowed to react after supplying all raw material monomers to a reactor, a copolymer containing a higher amount of high reactive monomers than an average composition is generated in the initial stage. A copolymer with a composition close to the average composition is generated in the middle stage. A copolymer containing a higher amount of low reactive monomers than the average composition is generated in the final stage.

In order to improve such a situation, thus far various studies have been made. For instance, a dropping polymerization method in which the raw material monomers are continuously supplied is known. The dropping polymerization method is a reaction mode in which a solvent alone, or solvent and only a part of raw material monomers is (are) fed in the reactor and, after it is heated to a reaction temperature, the remaining large part of the raw material monomers is slowly supplied to the reactor over hours. Also, in the dropping polymerization method, although the copolymer produced in the initial, middle, and final stages has the biased composition, since a time period corresponding to the middle stage is relatively longer, compared with that in the batch style, the percentage of a copolymer with the composition close to the average composition, which copolymer is generated in the time period of the middle stage, is high in a mixture of the copolymers. As a result, the influence of copolymers with the biased composition produced in the initial and final stages is small. And thus, improvement of solubility of the copolymer in a resist solvent and an improved effect of a defect and LER are observed.

Furthermore, in order to improve the above-mentioned situation, in the method for production of the copolymer for resists containing at least two or more kinds of monomers, improvement of the solubility of the copolymer in the resist solvent or the like by setting the percentage of a triad of each monomer not more than a specific amount has been proposed (for example, see Patent Literature 2).

However, due to the miniaturization of a photoresist pattern in recent years, necessity for further improvement of defects and LER is imminent. Therefore, a copolymer with a less biased composition than ever is demanded.

In particular, in the photoresists, the biased monomer composition ratio of a base polymer affects improvement of the solubility in the resist solvent, defects, LER or the like. Thus, in the production process of the base polymer, the homogeneity (to be less biased) of the monomer composition ratio is demanded. Hence, it has been desired to provide a base polymer with a less biased monomer composition ratio.

Patent Literature 1: JP 11-295894 A
Patent Literature 2: JP 2003-246825 A

SUMMARY OF THE INVENTION

The present invention is made in view of the above-mentioned background art, and an object of the present invention is to provide a method for production of a copolymer for photoresists with a less biased monomer composition ratio.

In order to solve the above-mentioned problem, the present inventors intensively studies to discover that, in the method for production of the copolymer for photoresists, the problem can be solved by making the monomer composition ratio of the unreacted monomers in the polymerization reaction system (hereinafter also referred to as an "unreacted monomer composition ratio") constant or nearly constant, thereby completing the present invention.

Accordingly, the present invention provides a method for production of a copolymer for photoresists,
the copolymer containing at least two kinds of repeating units,
the method comprising a supplying step of supplying a monomer solution and a solution containing a polymerization initiator into a polymerization reaction system,
wherein the range of fluctuation of the monomer composition ratio of unreacted monomers is within the range between minus 15% and plus 15% in the polymerization reaction system during the period from the start of the polymerization reaction to the end of supplying of the monomer solution.

Also, in another embodiment, the present invention provides a method for production of a copolymer for photoresists,
the copolymer containing at least two kinds of repeating units,
the method comprising a supplying step of supplying a monomer solution and a solution containing a polymerization initiator into a polymerization reaction system,
wherein the standard deviation of the monomer composition ratio of unreacted monomers is within 2 in the period from the start of the polymerization reaction to the end of supplying of the monomer solution.

According to the present invention, a method for production of a copolymer for photoresists in which the bias of the monomer composition ratio is small can be provided. According to such a method, by lessening the bias of the monomer composition ratio of the copolymer for photoresists, improvement of the solubility to a resist solvent, and improvement of defects and LER can be attained

DETAILED DESCRIPTION OF THE INVENTION

Figure 1:
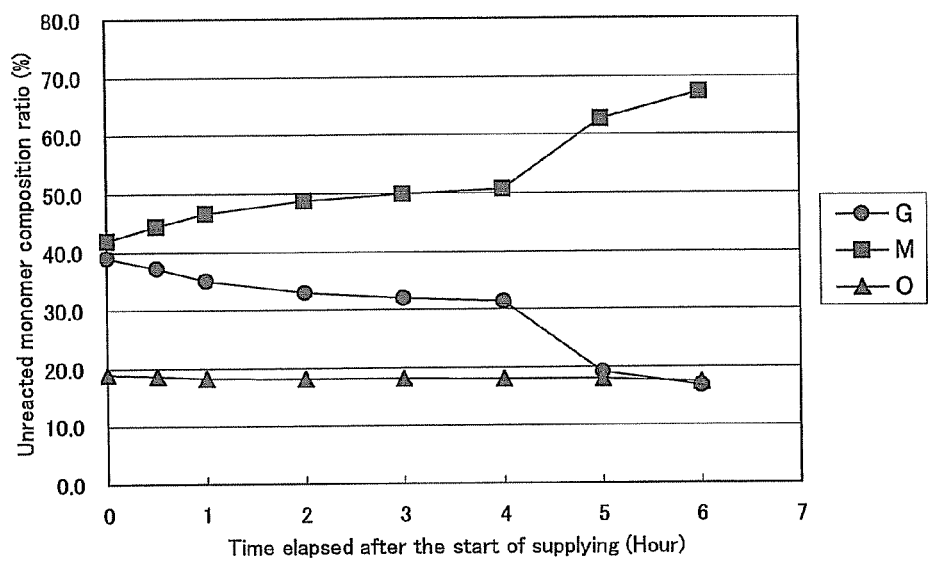
FIG. 1 is a figure showing the change with time of the unreacted monomer composition ratio in the polymerization reaction system in Comparative Synthesis Example 1.

A mode for carrying out the present invention will be described in detail below.

Structure of Copolymers

In a preferred embodiment of the present invention, the copolymer comprises at least two types of repeating units selected from the group consisting of a repeating unit (A) which is rendered alkali soluble by an acid, a repeating unit (B) having a polar group-containing alicyclic group, a repeating unit (C) having a lactone structure, a repeating unit (D) having a cyclic ether structure, and a repeating unit (E) having an acid stable dissolution-inhibiting structure. In addition, the copolymer may further include another arbitrary repeating unit (F).

Repeating Unit (A)

In a preferred embodiment of the present invention, examples of the repeating unit (A) which is rendered alkali soluble by an acid include compounds in which an acid-dissociable protecting group is bound to a repeating unit containing an alkali soluble substituent and compounds in which a repeating unit containing an alkali soluble substituent is modified with the acid-dissociable protecting group. Concrete examples thereof include compounds having a phenolic hydroxyl group, a carboxyl group, and a hydroxyfluoro alkyl group, which are protected by a non-polar acid-dissociable protecting group. Moreover, in another preferred embodiment, it is preferred that the repeating unit (A) have at least one selected from the group consisting of alkyl adamantanes, alkyl polycyclic hydrocarbons and 1-alkyl substituted (cycloalkyl) groups.

Examples of the repeating unit containing the alkali soluble substituent include hydroxystyrenes such as p-hydroxystyrene, m-hydroxystyrene, and p-hydroxy-α-methylstyrene; carboxylic acids having an ethylene double bond such as acrylic acid, methacrylic acid, maleic acid, fumaric acid, α-trifluoromethyl acrylic acid, 5-norbornene-2-carboxylic acid, 2-trifluoromethyl-5-norbornene-2-carboxylic acid, a carboxytetracyclo[4.4.0.1$^{2,5}$.1$^{7,10}$]dodecyl methacrylate; and monomers having a hydroxyfluoro alkyl group such as p-(2-hydroxy-1,1,1,3,3,3-hexafluoro-2-propyl) styrene, 2-(4-(2-hydroxy-1,1,1,3,3,3-hexafluoro-2-propyl)cyclohexyl)-1,1,1,3,3,3-hexafluoro propyl acrylate, 2-(4-(2-hydroxy-1,1,1,3,3,3-hexafluoro-2-propyl)cyclohexyl)-1,1,1,3, 3,3-hexafluoropropyl trifluoromethyl acrylate and 5-(2-hydroxy-1,1,1,3,3,3-hexafluoro-2-propyl)methyl-2-norbornene.

Examples of the acid-dissociable protecting group include saturated hydrocarbon groups such as a tert-butyl group, a tert-amyl group, a 1-methyl-1-cyclopentyl group, a 1-ethyl-1-cyclopentyl group, a 1-methyl-1-cyclohexyl group, a 1-ethyl-1-cyclohexyl group, a 2-methyl-2-adamantyl group, a 2-ethyl-2-adamantyl group, a 2-propyl-2-adamantyl group, a 2-(1-adamantyl)-2-propyl group, an 8-methyl-8-tricyclo[5.2.1.0$^{2,6}$]decanyl group, an 8-ethyl-8-tricyclo[5.2.1.0$^{2,6}$] decanyl group, an 8-methyl-8-tetracyclo[4.4.0.1$^{2,5}$.1$^{7,10}$] dodecanyl group, or an 8-ethyl-8-tetracyclo[4.4.0.1$^{2,5}$.1$^{7,10}$] dodecanyl group; and oxygen-containing hydrocarbon groups such as a 1-methoxy ethyl group, a 2-ethoxyethyl group, a 1-iso-propoxyethyl group, a 1-n-butoxyethyl group, a 1-tert-butoxyethyl group, a 1-cyclopentyloxyethyl group, a 1-cyclohexyloxyethyl group, a 1-tricyclo[5.2.1.0$^{2,6}$]decanyloxyethyl group, a 1-methoxymethyl group, a 2-ethoxymethyl group, a 1-iso-propoxymethyl group, a 1-n-butoxymethyl group, a 1-tert-butoxymethyl group, a 1-cyclopentyloxymethyl group, a 1-cyclohexyloxymethyl group; a 1-tricyclo[5.2.1.0$^{2,6}$]decanyloxymethyl group or a tert-butoxycarbonyl group.

Among these acid-dissociable protecting groups, because resistance to etching of the obtained resist polymer is high and a difference in solubility in an alkaline developer by the presence of the acid-dissociable protecting group is large, those containing an alicyclic structure are preferred. Concrete examples of the alicyclic structure include $C_5$-$C_{20}$ alicyclic structures in which alicyclic structure is a cyclopentane ring, a cyclohexane ring, an isobornane ring, a norbornane ring, an adamantane ring, a tricyclo[5.2.1.0$^{2,6}$]decane ring or a tetracyclo[4.4.0.1$^{2,5}$.1$^{7,10}$]dodecane ring.

As a concrete structure of the above-mentioned repeating unit (A), it is preferred to be a structure formed by protecting the hydroxyl and/or the carboxyl group of the alkali soluble substituent having the structure represented by the structural formulae (A1) to (A3) with the acid-dissociable protecting group having the structure represented by the structural formulae (a4) to (a5).

Structural formula (A1):

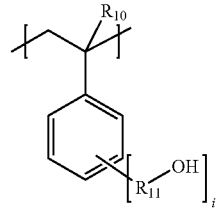

(A1)

(wherein $R_{10}$ is a hydrogen atom or a $C_1$-$C_4$ hydrocarbon group which may be substituted with a fluorine atom. Concrete examples thereof include a hydrogen atom and a $C_1$-$C_4$ alkyl group which may be substituted with a fluorine atom, such as a methyl group, an ethyl group, an n-propyl group, an i-propyl group, an n-butyl group, an i-butyl group, and a trifluoromethyl group, preferably a hydrogen atom, a methyl group, and a trifluoromethyl group. $R_{11}$ is a single bond or a $C_1$-$C_4$ bivalent hydrocarbon group which may be substituted with a fluorine atom. Concrete examples thereof include a single bond and a $C_1$-$C_4$ alkylene group which may be substituted with a fluorine atom, such as a methylene group, a 1,1-ethylene group, a 2,2-propylene group, a 1,1,1,3,3,3-hexafluoro-2,2-propylene group, and a 1,1,1-trifluoro-2-trifluoromethyl-2,3-propylene group. It is preferred to be a single bond, a 1,1,1,3,3,3-hexafluoro-2,2-propylene group, or a 1,1,1-trifluoro-2-trifluoromethyl-2,3-propylene group. It is particularly preferred to be a single bond. The "i" is an integer of 1 or 2).

Structural formula (A2):

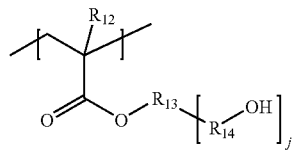

(A2)

(wherein $R_{12}$ is a hydrogen atom or a $C_1$-$C_4$ hydrocarbon group which may be substituted with a fluorine atom. Concrete examples thereof include a hydrogen atom and an $C_1$-$C_4$ alkyl group which may be substituted with a fluorine atom such as a methyl group, an ethyl group, an n-propyl group, an i-propyl group, an n-butyl group, an i-butyl group and a trifluoromethyl group, preferably a hydrogen atom, a methyl group, and a trifluoromethyl group. $R_{13}$ is a $C_2$-$C_{12}$ bivalent to tetravalent hydrocarbon group which may contain a fluorine atom, an oxygen atom, or a sulfur atom. Concrete examples thereof include a linear or branched saturated hydrocarbon group such as an ethylene group or an isopropylene group; and a saturated alicyclic hydrocarbon group having a cyclohexane ring, a norbornane ring, a 7-oxa-norbornane ring, a 7-thia-norbornane ring, an adamantane ring or a tetracyclo[$4.4.0.1^{2,5}.1^{7,10}$]dodecane ring. It is preferred to be a cyclohexane ring, a norbornane ring or an adamantane ring. $R_{14}$ is a single bond or a $C_1$-$C_4$ bivalent hydrocarbon group which may be substituted with a fluorine atom. Concrete examples thereof include a single bond, an $C_1$-$C_4$ alkylene group which may be substituted with a fluorine atom such as a methylene group, a 1,1-ethylene group, a 2,2-propylene group, a 1,1,1,3,3,3-hexafluoro-2,2-propylene group or a 1,1,1-trifluoro-2-trifluoromethyl-2,3-propylene group. It is preferred to be a single bond, a 1,1,1,3,3,3-hexafluoro-2,2-propylene group or a 1,1,1-trifluoro-2-trifluoromethyl-2,3-propylene group. The combination in which $R_{13}$ is an adamantyl group and $R_{14}$ is a single bond is particularly preferred. The "j" represents an integer of 1-3.)

Structural formula (A3):

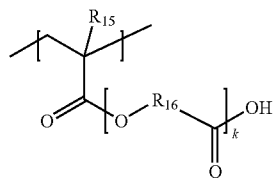

(A3)

(wherein $R_{15}$ is a hydrogen atom or a $C_1$-$C_4$ hydrocarbon group which may be substituted with a fluorine atom. Concrete examples thereof include a hydrogen atom and a $C_1$-$C_4$ alkyl group which may be substituted with a fluorine atom, such as a methyl group, an ethyl group, an n-propyl group, an i-propyl group, an n-butyl group, an i-butyl group or a trifluoromethyl group. It is preferred to be a hydrogen atom, a methyl group or a trifluoromethyl group. $R_{16}$ is a $C_6$-$C_{12}$ bivalent alicyclic hydrocarbon group which may contain an oxygen atom, or a sulfur atom. Concrete examples thereof include saturated alicyclic hydrocarbon groups having a norbornane ring, a 7-oxa-norbornane, a 7-thia-norbornane ring and a tetracyclo[$4.4.0.1^{2,5}.1^{7,10}$]dodecane ring. It is preferred to be a norbornane ring or a tetracyclo[$4.4.0.1^{2,5}.1^{7,10}$]dodecane ring. The "k" represents the integer of 0 or 1.)

Structural formula (a4):

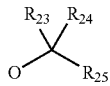

(a4)

(wherein o represents the binding site of the formula (a4). $R_{23}$ and $R_{24}$ are independently a $C_1$-$C_4$ hydrocarbon group, and concrete examples thereof include $C_1$-$C_4$ alkyl groups such as a methyl group, an ethyl group, an n-propyl group, an i-propyl group, an n-butyl group and an i-butyl group. $R_{25}$ is a $C_1$-$C_{12}$ hydrocarbon group and concrete examples thereof include a leaner, branched, or cyclic $C_1$-$C_{12}$ alkyl group such as a methyl group, an ethyl group, an n-propyl group, an i-propyl group, an n-butyl group, an i-butyl group, a cyclopentyl group, a cyclohexyl group, a norbornyl group, a tricyclo[$5.2.1.0^{2,6}$]decanyl group, an adamantyl group and a tetracyclo[$4.4.0.1^{2,5}.1^{7,10}$]dodecanyl group. In addition, $R_{25}$ may, by binding to $R_{23}$ or $R_{24}$, form a ring, specifically a $C_5$-$C_{12}$ saturated alicyclic structure such as a cyclopentane ring, a cyclohexane ring, a norbornane ring, a tricyclo[$5.2.1.0^{2,6}$]decane ring, an adamantane ring or a tetracyclo[$4.4.0.1^{2,5}.1^{7,10}$]dodecane ring and the like.

Structural formula (a5):

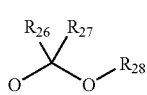

(a5)

(wherein o represents the binding site of the formula (a5), $R_{26}$ and $R_{27}$ are independently a hydrogen atom or a $C_1$-$C_4$ hydrocarbon group, and concrete examples thereof include a hydrogen atom and $C_1$-$C_4$ alkyl groups such as a methyl group, an ethyl group, an n-propyl group, an i-propyl group, an n-butyl group and an i-butyl group. $R_{28}$ is a $C_1$-$C_{12}$ hydrocarbon group and concrete examples thereof include a leaner, branched, or cyclic $C_1$-$C_{12}$ alkyl group such as a methyl group, an ethyl group, an n-propyl group, an i-propyl group, an n-butyl group, an i-butyl group, a t-butyl group, a 2-ethylhexyl group, a cyclopentyl group, a cyclohexyl group, a norbornyl group, a tricyclo[$5.2.1.0^{2,6}$]decanyl group, an adamantyl group or a tetracyclo[$4.4.0.1^{2,5}.1^{7,10}$]dodecanyl group. In addition, $R_{26}$ may, by binding to $R_{27}$ or $R_{28}$, form a ring. Concrete examples of the ring in which $R_{26}$ is bound to $R_{27}$ include a cyclopentane ring, a cyclohexane ring, a norbornane ring, a tricyclo[$5.2.1.0^{2,6}$]decane ring, an adamantane ring and a tetracyclo[$4.4.0.1^{2,5}.1^{7,10}$]dodecane ring. Also, concrete examples of the ring in which $R_{26}$ is bound to $R_{28}$ include a hydrofuran ring and a hydropyran ring.)

Repeating Unit (B)

In a preferred embodiment of the present invention, the repeating unit (B) having a polar group-containing alicyclic group is for improving adhesion to a semiconductor substrate.

Examples of the polar group-containing alicyclic group include alicyclic hydrocarbon groups containing a polar group such as a hydroxyl group, a carboxyl group, a fluoro alcohol group and a cyano group. Preferably, the repeating unit (B) is a repeating unit having a bridge-containing alicyclic group substituted with a hydroxyl group.

Examples of the repeating unit containing the alicyclic hydrocarbon group containing an alkali-soluble polar substituent or a polar substituent include monomers to which a polar group which gives alkali solubility to a bicyclo[2.2.1]heptyl group, a tetracyclo[$4.4.0.1^{2,5}$]dodecyl group, a 1-adamantyl group, 2-adamantyl group or the like, or a polar group is bound. Examples of the polar group which gives alkali solubility or the polar group include a hydroxyl group and a carboxyl group.

From the viewpoint that light transmission when used as a polymer for resists is high, as the alicyclic hydrocarbon group, a saturated alicyclic hydrocarbon group is preferred. Examples of the saturated alicyclic hydrocarbon group include a monocyclic alicyclic hydrocarbon group and a polycyclic alicyclic hydrocarbon group.

Examples of the monocyclic alicyclic hydrocarbon group include a cyclopropyl group, a cyclobutyl group, a cyclopentyl group, a cyclohexyl group, a cycloheptyl group and a cyclooctyl group. From the viewpoint of excellent sensitivity and resolution when used as the polymer for resists, the cyclopentyl group and a cyclohexyl group are preferred.

The polycyclic alicyclic hydrocarbon group can be, for example, a cross-linked cyclic hydrocarbon group, a spirane hydrocarbon group, a ring assembly hydrocarbon group or the like. Concrete examples thereof include a bicyclo[2.2.1]heptyl group, a tetracyclo[$4.4.0.1^{2,5}$]dodecyl group, a 1-adamantyl group and a 2-adamantyl group.

As a concrete structure of the monomer giving the repeating unit (B), the following structures are preferred. In the present invention, one type or plural types of the followings can be selected to use.

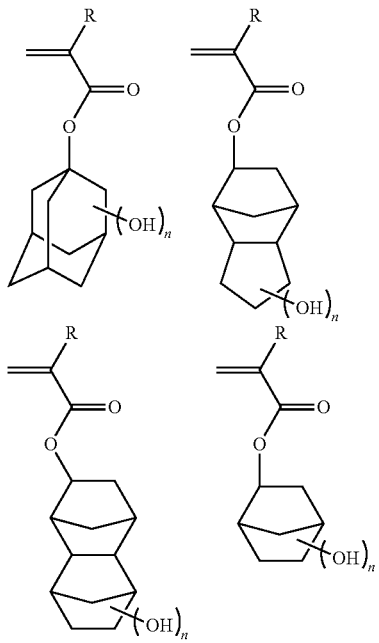

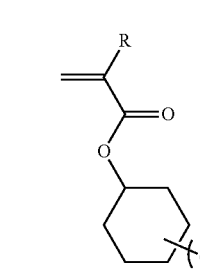 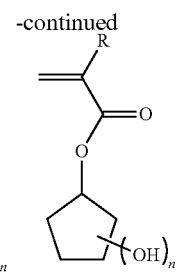

(wherein R is hydrogen or a methyl group, and n represents 1 to 3.)

Repeating Unit (C)

In a preferred embodiment of the present invention, the repeating unit (C) having the lactone structure is for improving adhesion to the substrate or underlayer film, or controlling solubility to a lithography solvent or alkaline developer. A preferred example of the structure of the monomer giving the repeating unit (C) includes the structure represented by the formula (C1).

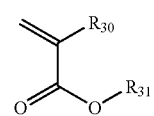

(C1)

Wherein (in the formula (C1)) $R_{30}$ is a hydrogen atom or a $C_1$-$C_4$ hydrocarbon group which may be substituted with a fluorine atom. Concrete examples thereof include a hydrogen atom, a $C_1$-$C_4$ alkyl group such as a methyl group, an ethyl group, an n-propyl group, an i-propyl group, an n-butyl group, an i-butyl group or a trifluoromethyl group. It is preferred to be a hydrogen atom, a methyl group, and a trifluoromethyl group. $R_{31}$ is a group containing the lactone structure represented by the formula (c).

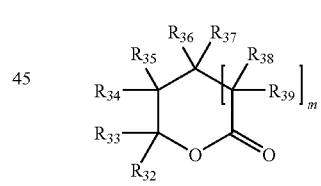

(c)

Wherein (in the formula (c)) any one of $R_{32}$-$R_{39}$ represents a single bond being a binding site of $R_{31}$ and the rest of $R_{32}$-$R_{39}$ represent a hydrogen atom, $C_1$-$C_4$ hydrocarbon group or $C_1$-$C_4$ alkoxy group; or any one of the $R_{32}$-$R_{39}$ represents a $C_3$-$C_{14}$ hydrocarbon group which may contain an oxygen atom or a sulfur atom and which has a biding site as $R_{31}$ and binds to any one or two of the other $R_{32}$-$R_{39}$ to form an alicyclic structure, any one or two of the remaining $R_{32}$-$R_{39}$ represent a single bond to form the above-described $C_5$-$C_{15}$ alicyclic structure and the rest of $R_{32}$-$R_{39}$ represent a hydrogen atom, $C_1$-$C_4$ hydrocarbon group or $C_1$-$C_4$ alkoxy group. The "m" represents an integer of 0 or 1.

Concrete examples of the alicyclic structure include a cyclopentane ring, a cyclohexane ring, a norbornane ring, a 7-oxa-norbornane ring, a 7-thia-norbornane ring, a tetracyclo[$4.4.0.1^{2,5}.1^{7,10}$]dodecane ring, with a norbornane ring and a 7-oxa-norbornane ring being preferred. Concrete examples of the $C_1$-$C_4$ hydrocarbon group include a methyl group, an ethyl group, an n-propyl group, an i-propyl group, an n-butyl group and an i-butyl group. Concrete examples of the $C_1$-$C_4$ alkoxy group include a methoxy group and an ethoxy group.

Particularly preferred examples of the lactone structure in which any one of $R_{32}$ to $R_{39}$ represents a single bond being the binding site of $R_{31}$ and the remaining $R_{32}$ to $R_{39}$ represent a hydrogen atom, a $C_1$-$C_4$ hydrocarbon group or a $C_1$-$C_4$ alkoxy group include γ-butyrolactone structures and δ-valerolactone structures. Particularly preferred examples of the lactone structure in which any one of the $R_{32}$-$R_{39}$ represents a $C_3$-$C_{14}$ hydrocarbon group which may contain an oxygen atom or a sulfur atom and which has a biding site as $R_{31}$ and binds to any one or two of the other $R_{32}$-$R_{39}$ to form an alicyclic structure, any one or two of the remaining $R_{32}$-$R_{39}$ represent a single bond to form the above-described $C_5$-$C_{15}$ alicyclic structure and the rest of $R_{32}$-$R_{39}$ represent a hydrogen atom, $C_1$-$C_4$ hydrocarbon group or $C_1$-$C_4$ alkoxy group include 1,3-cyclohexane carbolactone structures, 2,6-norbornane carbolactone structures, 7-oxa-2,6-norbornane carbolactone structures and 4-oxa-tricyclo[5.2.1.0$^{2,6}$]decane-3-on structures.

As a concrete structure of the monomer giving the repeating unit (C), the following structures are preferred. In the present invention, one type or plural types of the followings can be selected to use.

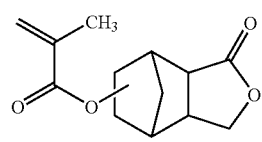

(C111)

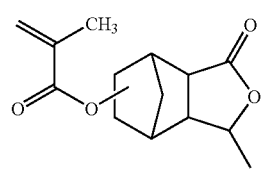

(C112)

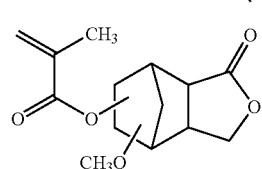

(C113)

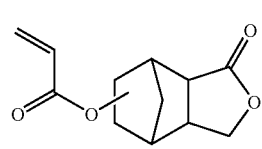

(C115)

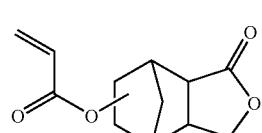

(C116)

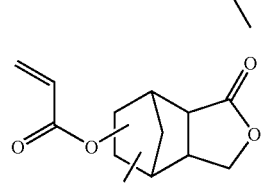

(C117)

-continued

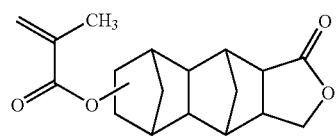

(C121)

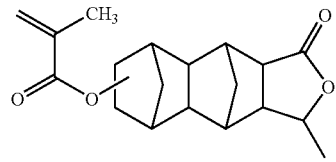

(C122)

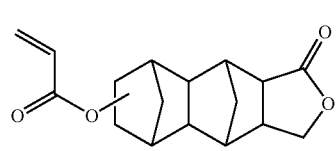

(C125)

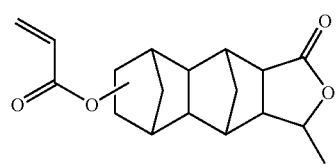

(C126)

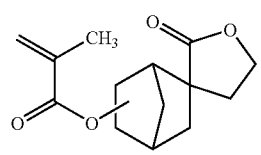

(C131)

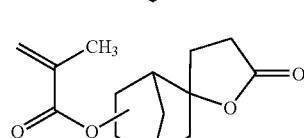

(C132)

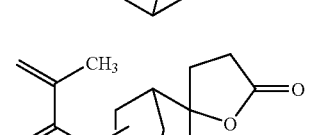

(C133)

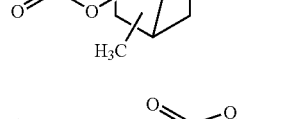

(C135)

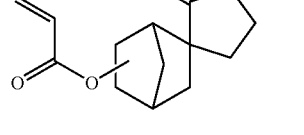

(C136)

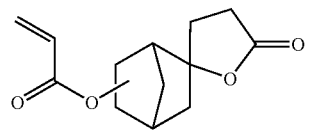

(C137)

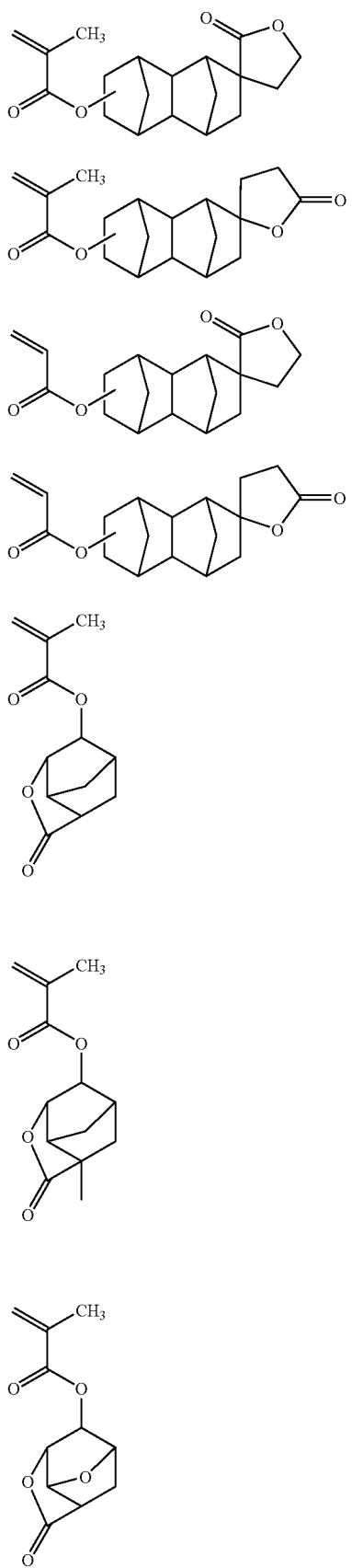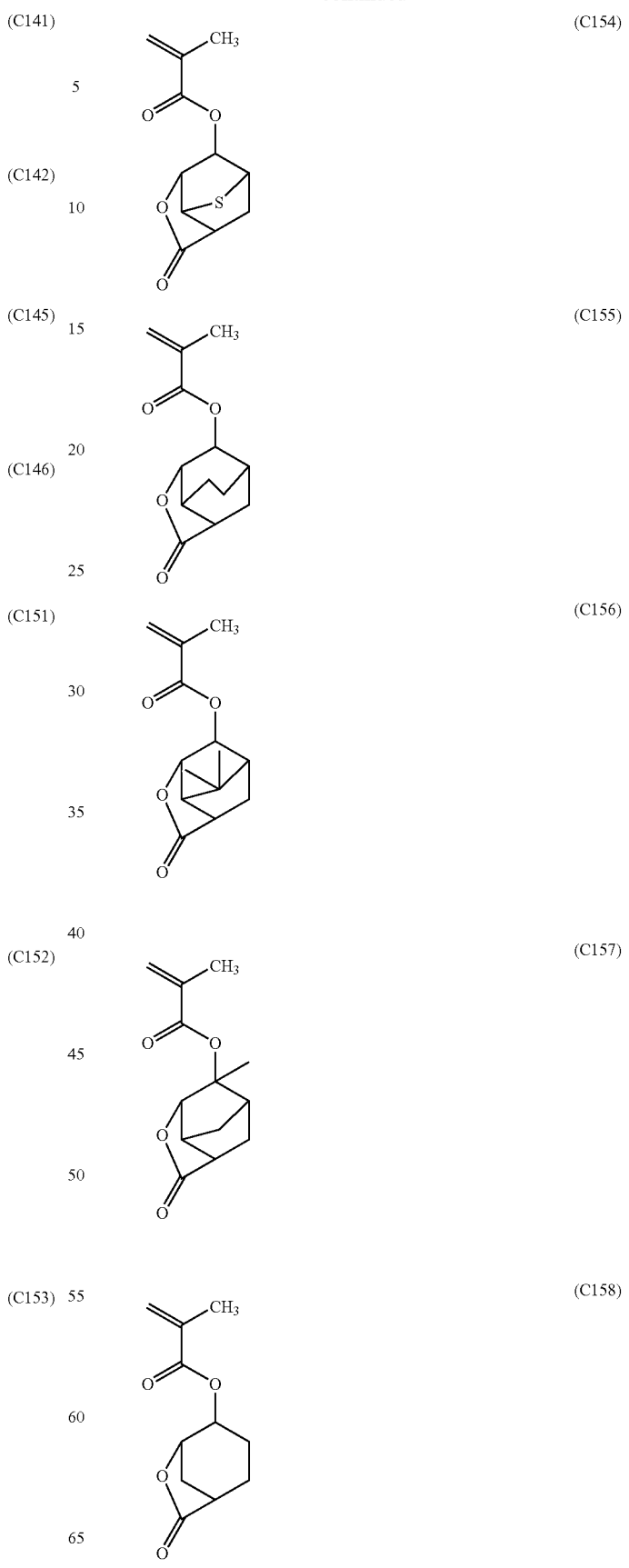

(C159) 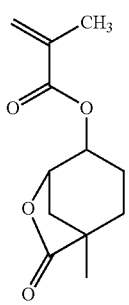
(C160) 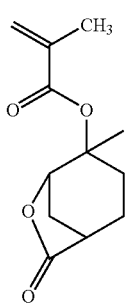
(C171) 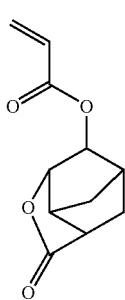
(C172) 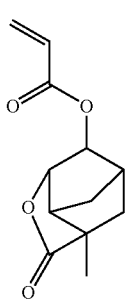
(C173) 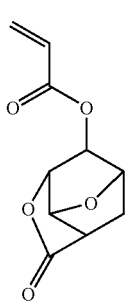
(C174) 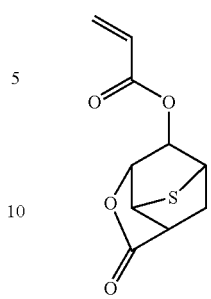
(C175) 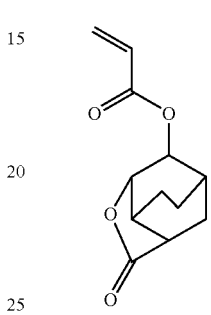
(C176) 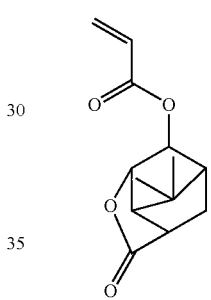
(C177) 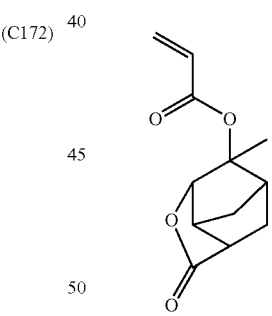
(C178) 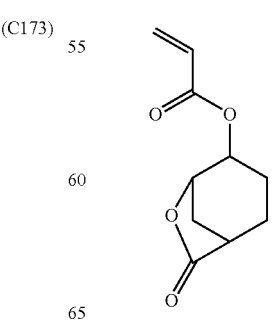

-continued (C179)
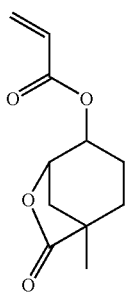

(C180)
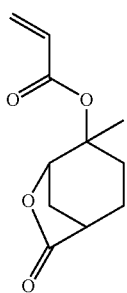

Repeating Unit (D)

In a preferred embodiment of the present invention, the repeating unit (D) having the cyclic ether structure has a function to improve adhesion to the substrate or underlayer film, to control solubility in a lithography solvent or alkaline developer, or to react with a curing agent to form a crosslinked structure. A preferred example of the structure of the monomer giving the repeating unit (D) includes the structure represented by the formula (D1).

(D1)
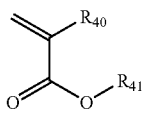

Wherein (in the formula (D1)) $R_{40}$ is a hydrogen atom or a $C_1$-$C_4$ hydrocarbon group which may be substituted with a fluorine atom. Concrete examples thereof include a hydrogen atom and a $C_1$-$C_4$ alkyl group such as a methyl group, an ethyl group, an n-propyl group, an i-propyl group, an n-butyl group, an i-butyl group, or a trifluoromethyl group. The hydrogen atom, methyl group and trifluoromethyl group are preferred. $R_{41}$ represents a $C_3$-$C_7$ hydrocarbon group containing a 3-6 membered cyclic ether structure. Concrete examples thereof include a hydrocarbon group having an epoxy ring, an oxetane ring, a tetrahydrofuran ring, or a tetrahydropyran ring. More concrete examples thereof include a glycidyl group, an oxetanyl methyl group, a tetrahydrofuranylmethyl group and a tetrahydropyranyl methyl group. The glycidyl group is particularly preferred.

As the concrete structure of the monomer giving the repeating unit (D), the following structures are preferred. In the present invention, one type or plural types of the followings can be selected to be used.

(D101)
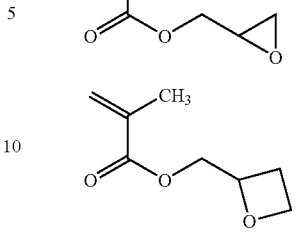

(D102)

(D103)

(D111)
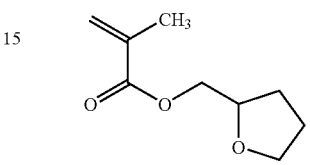

(D112)
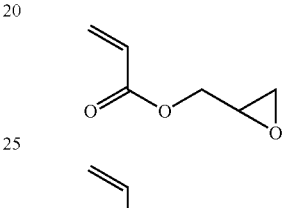

(D113)
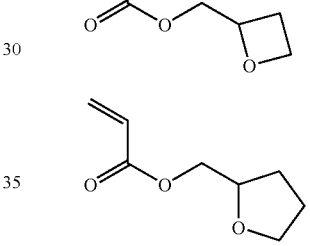

Repeating Unit (E)

In a preferred embodiment of the present invention, the repeating unit (E) having the acid stable dissolution-inhibiting structure is for acting to control solubility in a lithography solvent or alkaline developer, and optical properties such as a refractive index or light transmittance of a thin film. Preferred examples of the structure of the monomer giving the repeating unit (E) include a monomer (E1), a monomer (E2), and a monomer (E3), which are a monomer which can give the repeating unit in which the hydrogen atom of the hydroxyl group of the structure represented by the structural formulae (A1), (A2) and (A3) is substituted with the acid stable dissolution-inhibiting group, respectively.

Examples of the acid stable dissolution-inhibiting group of the monomers (E1) to (E3) include a $C_1$-$C_{12}$ hydrocarbon group in which a carbon substituted with a hydrogen atom of a hydroxyl group and bound to the oxygen atom is the primary to tertiary carbon, or a structure to which 1-adamantyl group in bound. Specific examples include linear, branched, or cyclic $C_1$-$C_{12}$ alkyl groups such as a methyl group, an ethyl group, an n-propyl group, an i-propyl group, an n-butyl group, an i-butyl group, a cyclopentyl group, a cyclohexyl group, a 2-norbornyl group, a 2-isobornyl group, an 8-tricyclo[5.2.1.0$^{2,6}$]decanyl group, a 1-adamantyl group, a 2-adamantyl group and a 4-tetracyclo[4.4.0.1$^{2,5}$.1$^{7,10}$]dodecanyl group.

In addition, another preferred example is the monomer (E4) represented by the formula (E4).

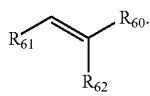
(E4)

Wherein (in the formula (E4)) $R_{60}$ represents a hydrogen atom or a $C_1$-$C_4$ hydrocarbon group which may be substituted with a fluorine atom. Concrete examples thereof include a hydrogen atom and a $C_1$-$C_4$ alkyl group such as a methyl group, an ethyl group, an n-propyl group, an i-propyl group, an n-butyl group, an i-butyl group or a trifluoromethyl group. The hydrogen atom, methyl group and trifluoromethyl group are preferred. $R_{61}$ represents a single bond or a $C_1$-$C_4$ hydrocarbon group bound to $R_{62}$ or a hydrogen atom. Concrete examples thereof include a hydrogen atom, a single bond, a methylene group, an ethylene group and an isopropylene group. $R_{62}$ is a $C_6$-$C_{14}$ aromatic hydrocarbon group and concrete examples thereof include a benzene ring, a naphthalene ring and an anthracene ring.

As the concrete structure of the monomer giving the repeating unit (E), the following structures are preferred. In the present invention, one type or plural types of the followings can be selected to be used.

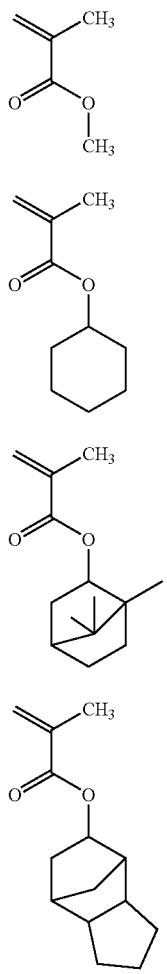

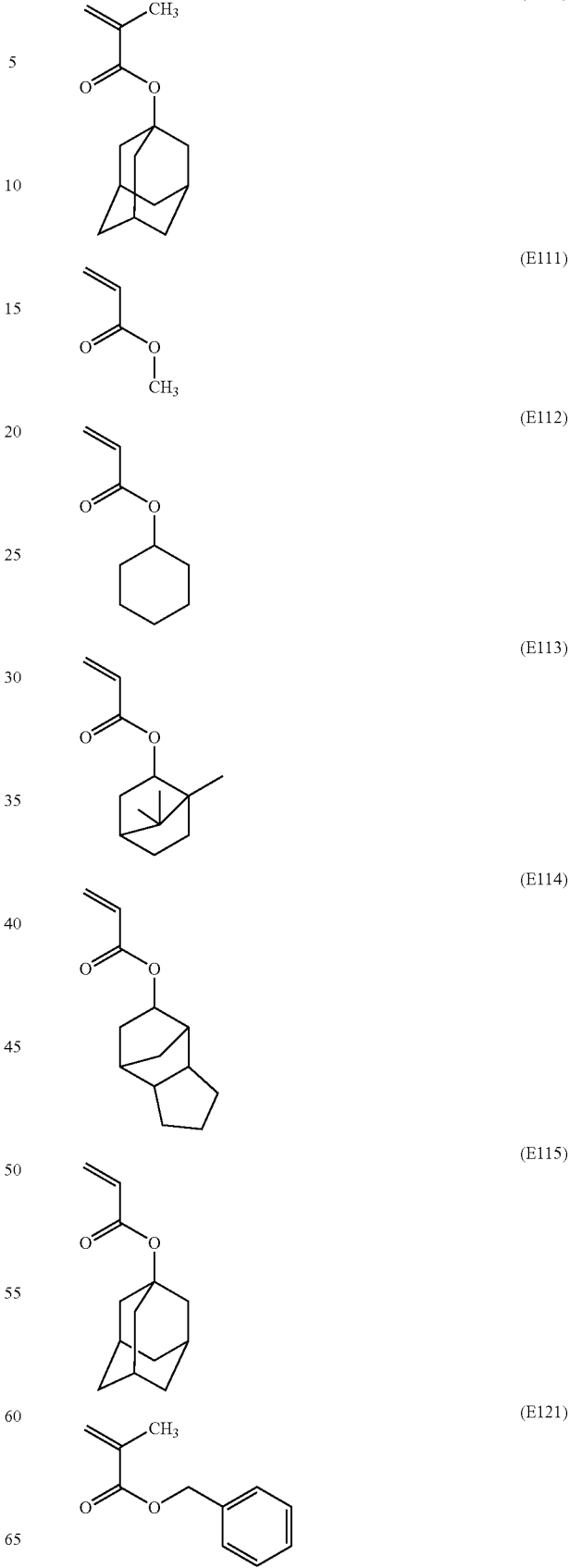

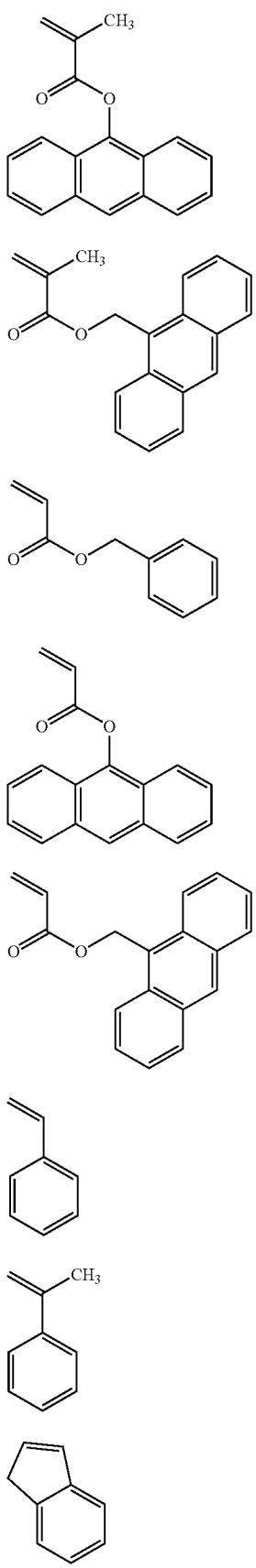

Terminal Structure

In a preferred embodiment of the present invention, the copolymer includes a known terminal structure. Usually, a radical structure generated from a radical polymerization initiator is included as a polymerization initiation terminal. When a chain transfer agent is used, the radical structure generated from the chain transfer agent is included as the polymerization initiation terminal. When chain transferred to a solvent, a monomer or the like occurs, the radical structure generated from the solvent or the monomer is included as the polymerization initiation terminal. In cases where a termination reaction is recombination termination, the polymerization initiation terminal can be included at both ends, while in the case of disproportionation termination, the polymerization initiation terminal can be included at one end and the terminal structure originated from the monomer can be included at the other end. When a polymerization terminator is used, the polymerization initiation terminal can be included at one end and the terminal structure originated from the polymerization terminator can be included at the other end. A plurality of these initiation and termination reactions can occur in one polymerization reaction. In that case, the resultant is a mixture of a copolymer having a plurality of terminal structures. The polymerization initiator, chain transfer agent, and solvent which can be used in the present invention will be described later.

Molecular Weight, Degree of Dispersion

In the copolymer according to the present invention, the solubility thereof in a resist solvent and alkaline developer is decreased when the weight average molecular weight (hereinafter, may be referred to as "Mw") is too large. On the other hand, when the weight average molecular weight is too low, coating performance of the resist is poor. Because of this, the Mw is preferably within a range of 1,000 to 50,000, more preferably within a range of 1,500 to 30,000, still more preferably within a range of 2,000 to 20,000, and particularly preferably within a range of 3,000 to 15,000. Moreover, since a desired pattern shape may not be acquired in a lithography process when molecular weight distribution is too large or too small, the degree of dispersion (hereinafter also referred to as "Mw/Mn") is preferably within a range of 1.0 to 5.0, more preferably within a range of 1.0 to 3.0, still more preferably within a range of 1.2 to 2.5, and particularly preferably within a range of 1.4 to 2.0.

Solvent for Coating Film Formation

As long as the solvent for coating film formation can dissolve each component constituting a lithography composition to be a uniform solution, any solvent may be employed. Any solvent among those known as the solvent for coating film formation can be used as one type of solvent singly, or two or more types of mixed solvent. Due to excellent solubility, a solvent which has at least one or more types of polar groups selected from a ketone bond, an ester bond, an ether linkage, and a hydroxyl group is preferred. Among them, a solvent whose boiling point under atmospheric pressure is 110 to 220° C. is particularly preferred because it has a moderate evaporation rate in baking after spin coating and such a solvent has excellent film-forming properties. Examples of such a solvent include solvents having ketone bonds such as methyl isobutyl ketone, methyl isoamyl ketone, methyl amyl ketone and cyclohexanone; solvents having ether bonds and hydroxyl groups such as propylene glycol monomethyl ether and propylene-glycol monoethyl ether; solvents having ether bonds and ester bonds such as propylene-glycol-monomethyl-ether acetate (PGMEA), propylene-glycol monoethyl ether acetate and 3-ethoxyethyl propionate; solvents having ester bonds and hydroxyl groups such as methyl lactate and ethyl lactate (EL); and solvents having ester bonds such as gamma-butyrolactone. A solvent containing PGMEA is particularly preferred.

Copolymer Solution

The copolymer solution for lithography comprises the above-mentioned copolymer and solvent for coating film formation. Also, an additive required to be used as the lithography compositions may also be included.

The concentration of the copolymer contained in the solution is appropriately selected so as to have viscosity such that moderate film thickness can be obtained when coated onto the substrate. Yet it can also be set relatively high in a range where the copolymer can be dissolved, such that the polymer solution can be mixed later with the solvent contained in the solution, other solvents which are not contained in the solution, other copolymer solutions for lithography or the like. Usually, the concentration of the copolymer in the solution is adjusted to a range of 2 to 60% by weight, preferably 3 to 50% by weight, particularly 5 to 35% by weight.

Examples of an additive required to be used as the lithography composition include, when the lithography composition is a chemically amplified-type resist composition, a radiosensitive acid generator, acid diffusion inhibitors such as a nitrogen-containing organic compound for preventing diffusion of the acid to a portion which is not exposed to radiation, and, as required, other additives.

The above-mentioned radiosensitive acid generator can be appropriately selected to be used from those which have thus far been proposed as the radiosensitive acid generator for chemically amplified-type resists. Examples of this include onium salts such as an iodonium salt and a sulfonium salt, diazomethanes such as oxime sulfonate, bisalkyl or bisaryl sulfonyldiazomethanes, nitrobenzyl sulfonates, iminosulfonates, and disulfones. Among them, the onium salt with a fluoroalkyl sulfonic acid ion as an anion is particularly preferred. These may be used individually, or two or more of these may be used in combination. The radiosensitive acid generator is usually used in a range of 0.5 to 30 parts by weight, preferably 1 to 10 parts by weight, based on 100 parts by weight of the copolymer.

The above-mentioned acid diffusion inhibitor can be appropriately selected to be used from those which have thus far been proposed as the acid diffusion inhibitor for chemically amplified-type resists. Examples of such the acid diffusion inhibitor include nitrogen-containing organic compounds, preferably the primary to tertiary alkylamine or hydroxyalkylamine. In particular, tertiary alkylamine or tertiary hydroxyalkylamine are preferred. Among them, triethanolamine and triisopropanolamine are especially preferred. These may be used individually, or two or more of these may be used in combination. The acid diffusion inhibitor is usually used in a range of 0.01 to 5.0 parts by weight based on 100 parts by weight of the copolymer.

As the other additive(s), compounds which are commonly used, such as organic carboxylic acids and phosphoric acids for the purpose of preventing the sensitivity deterioration of acid generator and improving, for example, a resist pattern and post-exposure stability, additional resin for improving the performance of resist film, surfactant for improving the coating properties, dissolution inhibiting agent, plasticizer, stabilizer, coloring agent, halation inhibitor and dye, may be appropriately added as required. Examples of the organic carboxylic acid include malonic acid, citric acid, malic acid, succinic acid, benzoic acid and salicylic acid. These may be used individually, or two or more of these may be used in combination. The organic carboxylic acid is used in a range of 0.01 to 5.0 parts by weight based on 100 parts by weight of the copolymer.

The Method for Production of the Copolymer

The method of production according to the present invention is a method for production of the copolymer for photoresists comprising at least two types of repeating units, the method having the supplying process of supplying the monomer solution and the solution containing the polymerization initiator into the polymerization reaction system, in which method, in the polymerization reaction system from the start of the polymerization reaction to the end of the supply of the monomer solution, the margin of fluctuation (all the margins of fluctuation of the composition ratio of each monomer) of the monomer composition ratio of the unreacted monomer is within a range between minus 15% and plus 15%, preferably within a range between minus 10% and plus 10%, more preferably within a range between minus 5% and plus 5%. In a preferred embodiment, from the point of the termination of supplying 1/6 to 1/3 of the total weight of the monomer solution to be supplied to the end of supplying (for example, from the point of the termination of supplying one fourth of the total weight of the monomer solution to be supplied to the end of supplying), in the polymerization reaction system, the margin of fluctuation of the monomer composition ratio of the unreacted monomer is within a range between minus 7% and plus 7%, preferably within a range between minus 5% and plus 5%. The margin of fluctuation of an unreacted monomer composition ratio can be based on the unreacted monomer composition ratio at the time of stability in the middle stage (monomer composition ratio (I) which is determined below). Additionally, in another embodiment, in the polymerization-reaction system, from the start of the polymerization reaction to the end of supplying of the monomer solution, the standard deviation (all the standard deviation of each monomer composition ratio) of the monomer composition ratio of the unreacted monomer is within 2, preferably within 1.5, more preferably within 1.3. As long as the margin of fluctuation or standard deviation of the unreacted monomer composition ratio are within the range described above, in the polymerization reaction system, a copolymer with high composition-homogeneity can be stably produced.

In a preferred embodiment of the method for production according to the present invention, it is preferred that the monomer composition ratio of the monomer solution at the time of the start of supplying in the supply process and/or the monomer composition ratio of the monomer solution fed in the polymerization reaction system in advance (hereinafter, both may be together referred to as an "initial monomer composition ratio") be determined by the polymerization reaction procedures of the copolymer comprising the following procedures (a) to (d):

(a) supplying the monomer solution having the monomer composition ratio (II) identical or nearly identical to a production target composition ratio (X) of the copolymer and the solution containing the polymerization initiator in the polymerization reaction system, (b) measuring change with time of the composition ratio of the unreacted monomer in the polymerization reaction system (c) determining a monomer composition ratio at the time when the composition ratio measured in the procedure (b) is constant or nearly constant, and (d) taking the monomer composition-ratio (I) determined in the procedure (c) as the monomer composition ratio of the monomer solution at the time of the start of supplying in the above-mentioned supply process and/or the monomer composition ratio of the monomer solution fed in the polymerization reaction system in advance. By determining an initial monomer composition ratio with such procedures, the unreacted monomer composition ratio in the polymerization reaction system can be stabilized at the initial stage.

In a preferred embodiment of the method for production according to the present invention, it is preferred that monomer composition-ratio (I) equals a composition ratio at which the monomer is consumed by the monomer composition ratio (II) in the polymerization reaction system. This is because, by the monomer being consumed in this way, the unreacted monomer composition ratio in the polymerization reaction system is in a stable state and the polymer to be generated has a small bias.

In the supplying process, it is preferred to change the monomer composition ratio of the monomer solution to be supplied stepwise or continuously. For example, it is preferred to change the monomer composition ratio from the monomer composition ratio (I) to the monomer composition-ratio (II) stepwise or continuously. It is further preferred that the weight ratio of the amount of the supply of monomer solution with monomer composition ratio (I) to the amount of the supply of monomer solution with monomer composition ratio (II) be 1:3 to 1:30. Moreover, in another preferred embodiment, in the supplying process, after supplying 1/30 to 1/3 of the total weight of the monomer solution to be supplied, it is preferred to change the monomer composition ratio stepwise or continuously. This is because, by appropriately adjusting the composition ratio and the amount of the supply of the monomer solution, the unreacted monomer composition ratio in the polymerization reaction system is in a stable state and thus the polymer to be generated has smaller bias.

In addition, the monomer composition ratio (II) identical or nearly identical to the production target composition ratio (X) means that all of the composition ratios of each monomer are individually within a range between minus 10% and plus 10%, preferably within a range between minus 5% and plus 5%, more preferably within a range between minus 4% and plus 4%, based on the production target composition ratio (X). For instance, in the case of the range within minus 10% and plus 10%, for (X)=40/40/20, the ratio is within a range of (II)=36 to 44/36 to 44/18 to 22.

The method of production according to the present invention can be carried out using the monomer capable of giving the above-mentioned repeating units (A) to (E), a solvent, a polymerization initiator, a chain transfer agent, other additives and the like, and can include the following steps.

Polymerization Reaction Step

According to a preferred embodiment of the present invention, any of the well-known methods for polymerization including radical polymerization, cationic polymerization, living anionic polymerization and ring-opening polymerization and the like can be applied to the polymerization of the monomers capable of giving at least two types of repeating units selected from the group consisting of the repeating unit (A) which is rendered alkali soluble by an acid, the repeating unit (B) having the polar group-containing alicyclic group, the repeating unit (C) having the lactone structure, the repeating unit (D) having the cyclic ether structure, the repeating unit (E) having the acid stable dissolution-inhibiting structure, and other arbitrary repeating units (F).

For instance, in the case of protecting the alkali soluble substituent in the structure with alkali solubility by the acid-dissociable protecting group after polymerizing the monomer having the structure with alkali solubility, the compound having the above-mentioned alkali soluble group is used for the polymerization reaction as it is and then, allowed to react with a compound giving the substituent which does not dissolve in alkali, such as vinyl ether and halogenated alkyl ether, under an acid catalyst (acetalization reaction), thereby introducing the acid-dissociable protecting group. By protecting the alkali soluble substituent with an acid-dissociable, alkali insoluble protecting group, performance as photoresists which develops alkali solubility by the acid can be exhibited. Examples of the acid catalyst used for the reaction include p-toluenesulfonic acid, trifluoroacetic acid and highly acidic ion exchange resins.

In the present invention, a known polymerization apparatus can be used as a polymerization apparatus. It is preferred to use a polymerization bath equipped with at least a jacket for supplying a heat medium, and a stirring blade and a condenser as an apparatus capable of industrial mass-production. As for materials, in order to avoid contamination of metals and due to high thermal conductivity and high safety, a glass-lined metal container is preferred. It is preferred that the stirring blade be a three retreat blade impeller, partial blade such as TWINSTIR Impeller from Kobelco Eco-Solutions Co., Ltd., FULLZONE Impeller from Kobelco Eco-Solutions Co., Ltd., or full-face blade such as BENDLEAF Impeller from Hakko Sangyo Co., Ltd. A full-face blade such as FULLZONE Impeller and BENDLEAF Impeller is preferred for their high mixing efficiency.

It is preferred that the polymerization according to the present invention be carried out by so-called dropping method in which the monomer (monomer solution) and the polymerization initiator are dropped into a heated solvent. Part of the monomer may be included in the heated solvent in advance. Moreover, by dropping a plurality of solutions varying in the monomer composition, polymerization initiator concentration, chain transfer agent concentration, for example, the composition of the monomer dropped, the composition ratio of the monomer, polymerization initiator and chain transfer agent, or the like may be altered as the drop time.

Among the dropping methods, mixed dropping method in which the monomer in conjunction with the polymerization initiator is as required dissolved in a solvent, and the mixture is dropped into the heated solvent to be polymerized; and so-called independent dropping method in which the monomer and polymerization initiator are individually dissolved in the solvent as required, and separately dropped into the heated solvent to be polymerize can be adopted. Yet, since, in the mixed dropping method, there is a chance for the unreacted monomers to contact with a low concentration of radical in a state of a high concentration of the unreacted monomers in a dropping solution reservoir before dropping into the polymerization reaction system, a high polymer which causes generation of a micro-gel is likely to be generated. On the other hand, since, in the independent dropping method, high polymers are not generated because the monomers do not coexist with polymerization initiator in a dropping solution reservoir. Hence, the independent dropping method is particularly preferred.

In the independent dropping method, although the monomer solution and initiator solution can be preliminarily mixed immediately before the polymerization bath, since there is a possibility that the high polymer is generated by the time the mixture is dropped, it is particularly preferred that each of the monomer solution and initiator solution be independently dropped from separate reservoirs. The supplying rates of the monomer solution and initiator solution can be set individually such that the copolymer having a desired molecular weight distribution is obtained. It is also possible to obtain a copolymer with a diversity of molecular weight distribution of from narrow dispersion to wide dispersion with high reproducibility by changing either or both of the supplying rates of two solutions. For instance, when the amount of the initiator solution to be supplied in the earlier stage of the reaction is reduced while the amount of the initiator solution to be supplied is increased in the later stage of the reaction, since a copolymer with a relatively high molecular weight is generated in the first half of the reaction when a radical concentration is low, the copolymer with wide dispersion can be obtained. Each supplying rate can be changed stepwise or continuously.

The amount of the polymerization solvent which is fed to the reaction vessel in advance in the dropping method (hereinafter also referred to as an "initially fed solvent") may be not less than the minimum amount such that stirring is feasible. When the amount is more than needed, the amount of the monomer solution which can be supplied decreases and production efficiency falls, which is therefore not preferred. Usually, based on a whole supply (that is, a total amount of the initially fed solvent and the monomer solution and initiator solution to be dropped), for example, a ratio by volume is selected from a range of 1/30 to 1/2, preferably a range of 1/20 to 1/2, particularly preferably a range of 1/10 to 1/3. In addition, part of the monomer may be fed in the initially fed solvent in advance. As for the composition ratio of the monomer fed in advance, it is preferred to be same as the monomer composition ratio (I) at the time of the start of supplying. As for the amount of the monomer mixed in advance, it is preferred to be 0 to 50% by weight of the total amount of monomer solution to be supplied, more preferably 0 to 30% by weight.

From a standpoint of productivity, it is preferred that the concentration of the monomer and polymerization initiator in the dropping solution be high. In particular, in cases where the polymerizable monomer or polymerization initiator is liquid, it can be supplied as is without being dissolved in the solvent. In cases where the polymerizable monomer or polymerization initiator is viscous liquid or solid, it is preferably dissolved in the solvent and used. In cases where the polymerizable monomer or polymerization initiator is dissolved in the solvent and used, an unnecessarily high concentration increases the viscosity of the solution, thereby lowering the operativity. Moreover, in cases where the polymerizable monomer or polymerization initiator is solid, high polymers are likely to be generated since the polymerizable monomers or polymerization initiator may separate out and/or the diffusion thereof within the polymerization system may take longer. Therefore, within a viscosity range where no problems arise in supplying operations, it is preferred to select a concentration at which each monomer and polymerization initiator is fully dissolved, do not separate out while being supplied, and easily diffuse in the polymerization reaction system. Although concrete concentration varies depending on a combination of the solute and solvent in each solution and the like, usually the total concentration of all monomers and the concentration of the polymerization initiator are each prepared so as to be, for example, in a range of 5 to 60% by weight, preferably a range of 10 to 50% by weight.

The polymerization temperature can be appropriately selected depending on the boiling point of the solvent, the monomer, the chain transfer agent and the like, the half-life temperature of the polymerization initiator, and the like. At low temperature, since the polymerization does not easily progress, there is a problem in productivity. At a temperature higher than necessary, there is a problem in stability of the monomer and copolymer. Hence, it is preferred to select a range of 40 to 160° C., particularly preferably a range of 60 to 120° C.

In order to obtain, as targeted, the molecular weight of the copolymer and the copolymerization composition in the case of copolymerizing, it is preferred to control a polymerization temperature precisely. The polymerization reaction is a generally exothermic reaction, and since there is a tendency of the polymerization temperature to be increased by the polymerization reaction, it is difficult to keep a constant temperature. When the polymerization temperature rises too high, it is impossible to control the polymerization reaction and there is a case where the reaction burns up. For this reason, in the present invention, it is preferred to include at least one or more types of compounds which have the boiling point close to a targeted polymerization temperature as a polymerization solvent, and to set the polymerization temperature higher than the initial boiling point of the component contained as the polymerization solvent under the polymerization pressure. According to this method, an increase in the polymerization temperature can be suppressed by the latent heat of the vaporization of the polymerization solvent. Concrete examples of such a compound include water; ketones such as acetone, methyl ethyl ketone, methyl isobutyl ketone, methyl isoamyl ketone, methyl amyl ketone or cyclohexanone; alcohols such as methanol, ethanol or isopropanol; ether alcohols such as ethylene glycol monomethyl ether, ethylene glycol monoethyl ether, propylene glycol monomethyl ether or propylene glycol monoethyl ether; esters such as methyl acetate, ethyl acetate, isopropyl acetate, propyl acetate, butyl acetate, methyl propionate, methyl lactate or ethyl lactate; ether esters such as ethylene glycol monomethyl ether acetate, ethylene glycol monoethyl ether acetate, propylene glycol monomethyl ether acetate or propylene glycol monoethyl ether acetate; ethers such as tetrahydrofuran, 1,4-dioxane or ethylene glycol dimethyl ether; aromatic hydrocarbons such as toluene or xylene; N,N-dimethylformamide and acetonitrile. From the viewpoint of the boiling point and the solubility of the monomer, polymerization initiator, chain transfer agent, and copolymer, it is preferred to be acetone, methyl ethyl ketone, methyl isobutyl ketone, isopropanol, propylene glycol monomethyl ether, methyl acetate, ethyl acetate, isopropyl acetate, propyl acetate, methyl propionate, tetrahydrofuran, 1,4-dioxane, ethylene glycol dimethyl ether, toluene or acetonitrile. These compounds may be used singly or two or more of them may be used in combination. Additionally, a compound which has a high boiling point and high solubility of the monomer, polymerization initiator, chain transfer agent, and copolymer, such as ethylene glycol monobutyl ether, 3-methoxy-3-methyl-1-butanol, 3-methoxy-3-methyl-1-butyl acetate, 3-ethoxyethyl propionate, γ-butyrolactone, diethylene glycol dimethyl ether, N-methylpyrrolidone, or dimethyl sulfoxide, may be mixed and used.

For the polymerization initiator used for polymerization, those known as a radical polymerization initiator can be used. Preferably, it is the radical polymerization initiator such as azo compounds or peroxides. Concrete examples of the azo compounds include 2,2'-azobisisobutyronitrile, 2,2'-azobis (2-methylbutyronitrile), dimethyl-2,2'-azobis(2-methyl propionate), dimethyl-2,2'-azobis isobutyrate, 1,1'-azobis(cyclohexane-1-carbonitrile), 4,4'-azobis(4-cyanovaleric acid) and the like. Concrete examples of the peroxides include decanoyl peroxide, lauroyl peroxide, benzoyl peroxide, bis (3,5,5-trimethyl hexanoyl) peroxide, succinic acid peroxide, tert-butylperoxy-2-ethylhexanoate tert-butylperoxy pivalate, 1,1,3,3-tetramethylbutylperoxy-2-ethylhexanoate and the like. From the viewpoint of safety of handling, the azo compounds are particularly preferred. These can be used individually, or can be used in combination. The amount of the polymerization initiator to be used can be selected in view of Mw to be targeted; the types and composition ratio of the raw materials such as the monomer, the polymerization initiator and the chain transfer agent; and production conditions such as the polymerization temperature and dropping method.

For the chain transfer agent, those known as the chain transfer agent can be used as needed. Among them, thiol compounds are preferred and it can be widely selected out of known thiol compounds. Concrete examples thereof include t-dodecyl mercaptan, mercaptoethanol, mercaptoacetic acid, and mercaptopropionic acid. The amount of the chain transfer agent to be used can be selected in view of targeted Mw; the types and composition ratio of the raw materials such as the monomer, the polymerization initiator, the chain transfer agent and the solvent; and production conditions such as the polymerization temperature and dropping method. The chain transfer agent may be mixed with the monomer to be dropped, may be mixed with the polymerization initiator to be dropped, or may be dissolved into the solvent to be heated in advance.

Polymerization-Reaction Termination Step

In a preferred embodiment of the present invention, the method for production can include the step of terminating the polymerization reaction by cooling or adding a heavy metal after supplying the entire amount of the monomer solution. For example, it is preferred to rapidly cool the inside of a polymerization-reaction system immediately after supplying the entire amount of the monomer solution. The polymerization reaction can be instantly terminated by the rapid cooling and thus generation of a polymer with the large bias of the monomer composition can be prevented. Or, although the polymerization reaction may be terminated by adding the heavy metal, since a treatment to remove the heavy metal is required after that, it is more preferred to terminate the polymerization reaction by the rapid cooling.

Purification Step

In a preferred embodiment of the present invention, the method for production can include, after polymerization, a step of purifying the copolymer solution by a known method such as reprecipitation in the solvent or the like. For example, the reaction solution is dropped into a large amount of poor solvents (toluene, hexane, methanol, water or the like) to precipitate the generated resin and to separate the resin from the poor solvent including remaining monomers and low molecular weight products. Subsequently, an operation of washing the resin with the poor solvent is repeated several times, to purify the resin. A resin suitable for photoresists having good properties and little content of low molecular weight components can be obtained by extracting and removing low molecular weight components, such as unreacted materials including the monomer and polymerization initiator as well as an oligomer from the copolymer solution to the solvent by a series of such operations, Demetallation Step In a preferred embodiment of the present invention, the method for production can include the step of removing a metal ion or the like by filtering the copolymer solution through a filter. Preferably, it is after the above-mentioned purification step that the demetallation is carried out. The resin suitable for photoresists having good properties and little content of the metal can be obtained by filtering the purified copolymer solution through a demetallation filter to remove the metal ion or the like.

Examples of the above-mentioned filter include depth filters composed of filter aids such as diatomaceous earth, cellulose, and the like; membrane filters made of materials selected from polyolefin such as polyethylene and polypropylene, polar group-containing resins such as polyamide, polyester and polyacrylonitrile, and fluorine-containing resins such as polyethylene fluorides. Examples of the depth filter include Zeta plus 40QSH and Zeta plus 020GN manufactured by Cuno. Examples of the membrane filter include filters made of polyethylene such as Microguard and Optimizer D manufactured by Nihon Entegris K.K.; filters made of nylon such as Ultipleat P-Nylon 66 and Ultipor N66 manufactured by Nippon Pall Ltd., PhotoSHIELD and Electropor IIEF manufactured by Cuno; and filters made from polyethylene fluoride such as P Emflon manufactured by Nippon Pall Ltd. Usually, those having a filtering accuracy of not more than 1 μm are used. Those having a filtering accuracy of preferably not more than 0.5 μm, particularly preferably not more than 0.05 μm are used. These filters may be used individually or two or more types may be used in combination.

Method for Determining the Monomer Composition Ratio

In a preferred embodiment of the present invention, the monomer composition ratio of the monomer solution at the time of the start of supplying in the supplying step, and/or the monomer composition ratio of the monomer solution fed in the polymerization reaction system in advance can be determined by the polymerization reaction procedures of the copolymer comprising the above-mentioned procedures (a) to (d).

A case of synthesizing the copolymer in which three kinds of monomers, X, Y and Z are copolymerized with a production target composition ratio of a/b/c (wherein a+b+c=100%) will be illustrated as an example. Yet, the present invention is not limited to the example below. The composition ratio in the present invention refers to a molar ratio.

Procedure (a)

The monomer solution having the same composition as production target composition ratio a/b/c, and the solution containing the polymerization initiator are supplied in small portions over a long period of time (about 2 to 6 hours), to carry out dropping polymerization.

Procedure (b)

Part of the reaction solution is sampled every given amount of time from the initial stage of the reaction and the unreacted monomer composition is analyzed, thereby measuring change with time of the unreacted monomer composition ratio. As means for analyzing, a widely-used analytical technique such as LC or GC may be used.

Procedure (c)

When a relationship between a time period and a reaction solution composition is examined, the unreacted monomer composition ratio changes in the initial stage of the reaction, but in the middle stage after that, the monomer composition ratio is almost stable (constant or nearly constant), and the unreacted monomer composition ratio changes again in the final stage after the supplying of all monomer solutions is over. The measured value (average value) of the unreacted monomer composition ratio at the time of the stability in the middle stage is referred to as A/B/C. The stability (constant or nearly constant) of the monomer composition ratio refers to a state in which the composition (by mole) of each monomer is, based on the unreacted monomer composition ratio at the time of the stability in the middle stage, within a range between minus 10% and plus 10%, preferably within a range between minus 5% and plus 5%, more preferably within a range between minus 4% and plus 4%.

Procedure (d)

The monomer composition ratio A/B/C determined in the procedure (c) is referred to as an initial monomer composition ratio (I). The initial monomer composition ratio (I) can be determined by the polymerization reaction procedures of the copolymer comprising the procedures described above.

Subsequently, based on the result of the above-mentioned determination, a procedure for synthesizing a copolymer with a small composition bias will be described. First, two types of raw material monomer solutions are prepared. Monomer solution (I) is a solution in which monomers X, Y, and Z are mixed at a ratio of composition ratio A/B/C, while monomer solution (II) is a solution in which monomers X, Y, and Z are mixed at a ratio of composition ratio a/b/c. As for the weight of the monomer solution (I) and monomer solution (II), it is preferred that monomer solution (I)/monomer solution (II) be from about 1/30 to about 1/3.

The solvent is poured into a reactor and heated to a reaction temperature. Thereafter, the monomer solution (I) and the polymerization initiator are supplied to start a reaction. After the supplying of the monomer solution (I) is over, the monomer solution (II) is slowly supplied over hours (preferably about 2 to 6 hours). By this procedure, the unreacted monomer composition ratio in the reactor is always a value close to A/B/C, and the composition of the generated copolymer can be a value close to a/b/c. When the supplying of monomer solution (II) is completed, the reaction is promptly terminated. Preferably, the reaction solution may be rapidly cooled. By this procedure, generation of a copolymer whose composition in the final stage of a conventional dropping polymerization method is biased can be suppressed.

In an improved synthetic method, theoretically, it is from the start of supplying the monomer solution (I) to the time point at which the stabilization is attained after switching the supply of the monomer solution to the monomer solution (II) that the unreacted monomer composition in the reactor may possibly vary from a target value of A/B/C. When the amount of supply of the monomer solution (I) is too much and the start of supply monomer solution (II) is too late, there is a concern that a copolymer which monomer composition is biased more toward a low reactive monomer is generated. Also, when the amount of supply of monomer solution (I) is too little, there are no differences in cases where the monomer solution (II) alone is copolymerized by a conventional dropping polymerization method and, in the initial stage, there is a concern that a copolymer which monomer composition is biased more towards a high reactive monomer is generated. Therefore, in this improved synthetic method, it is preferred to take a sample of the reaction solution every given time period to analyze the unreacted monomer composition, and to check if the unreacted monomer composition ratio greatly fluctuates from A/B/C. In cases where a fluctuation of the unreacted monomer composition ratio is observed, stabilization is feasible by adjusting the ratio of the amount of the monomer solution (I) and monomer solution (II) as well as the supply rate.

The above-mentioned determination of the monomer composition ratio at the time of the start of supplying can be made by the following procedures using following equipment. For the reactor, a 2 L four-mouth flask made by Pyrex is used. $N_2$ gas is blown to substitute a gas phase with $N_2$. A condenser and two material input nozzles are attached. Stirring is carried out with a magnet stirrer chip. The supply of a raw material monomer solution is carried out with one liquid sending pump and the supply of a polymerization initiator solution is carried out with another liquid-transferring pump. An oil bath is used for a heat source. By stirring with a motor, an uniform oil temperature is attained and controlled by a unit of 1° C. Sampling is carried out every given amount of time by opening one of the plugs of the flask, and a sampling amount is about 0.05 g. The amount of the unreacted monomer in the reaction solution can be measured using LC.

In the present invention, the monomer composition ratio of the copolymer to be generated can be adjusted to the production target composition by stabilizing the unreacted monomer composition ratio in the polymerization reaction system at the early stage. It is speculated that mechanisms for this are as follows. However, the present invention is in no way limited to the following explanation. First, differences in the reactivity of the polymerization reaction arise because of differences in the structure of each functional group in each monomer. Thus, when the polymerization reaction is carried out, by using the monomer solution of the same composition ratio as the production target composition ratio, since the reacting amount of monomers with relatively high reactivity increases whereas the reacting amount of monomers with relatively low reactivity decreases, the monomer composition ratio of the copolymer to be generated may be biased. The applicants have discovered, by making the monomer composition ratio of the unreacted monomer in the polymerization reaction system constant or nearly constant, the bias of the monomer composition ratio in the copolymer to be generated is lessened. This is presumably because, in the unreacted monomer composition ratio in the polymerization reaction system, an increase in the amount of the monomer with low reactivity results in an easier consumption of the monomer with low reactivity, leading the unreacted monomer composition to the equilibrium kinetically. Then, the unreacted monomer composition ratio in the polymerization reaction system in the case of using a plurality of types of specific monomers for the polymerization reaction is preliminarily measured, and the monomer composition ratio in a stable or nearly stable state is determined. Using a monomer solution having the determined monomer composition ratio (initial monomer composition ratio) in the initial stage, the polymerization reaction is carried out. It is thought that, by this procedure, the unreacted monomer composition can be stabilized at the early stage and, as a result, the bias of the composition ratio of the copolymer to be generated can be lessened at the early stage.

EXAMPLES

The present invention will now be described in more detail below by way of Examples and Comparative Examples; however, the present invention is by no means limited to the examples below.

Examination Method

The examination method of the following GPC, LC, and $^{13}C$-NMR is as follows.

GPC: Measurement of Mw and Mw/Mn of the copolymer

Measurement was carried out by GPC. Conditions for analysis are as follows.

Apparatus: GPC8220 manufactured by Tosoh Corporation
Detector: Differential refractive index (RI) detector
Column: KF-804L (×3) manufactured by Showa Denko K. K.
Sample: Test samples for measurement were prepared by dissolving about 0.02 g of a powder of a copolymer in about 1 ml of tetrahydrofuran. An amount to be injected to GPC was set to 60 μl.
LC: Measurement of the monomer composition ratio of the reaction mixture
Apparatus: GPC8220 manufactured by Tosoh Corporation
Detector: Differential refractive index (RI) detector
Column: TSKgel SuperHZ1000 (×4) manufactured by Tosoh Corporation
Sample: Test samples for measurement were prepared by dissolving about 0.10 g of a polymerization reaction solution in about 1 ml of tetrahydrofuran. An amount to be injected to LC was set to 5 μl.
$^{13}$C-NMR: Measurement of the composition of a repeating unit of the copolymer, and detection of the reaction product
Equipment: AV400 manufactured by Bruker
Sample: Test samples were prepared by dissolving about 1 g of a powder of a copolymer and 0.1 g of acetylacetone chromium in a mixture of 0.5 g of methyl ethyl ketone and 1.5 g of deuterated acetone.
Measurement: 40° C., the diameter of a measurement tube 10 mm, and the number of integration 10,000 times
The composition of the copolymer was expressed with the total of components detectable by $^{13}$C-NMR spectrum as 100%. (Acrylic acid and methacrylic acid are omitted because they are undetectable.)

Determination of the Initial Monomer Composition Ratio

The initial monomer composition ratio was determined by the following procedures. In each of Comparative Synthesis Example, the composition ratio (molar ratio) of monomers to be supplied was prepared such that monomers with low reactivity were slightly more than the production target composition ratio whereas monomers with high reactivity were slightly less than the production target composition ratio. This is a procedure for synthesis aiming the monomer composition ratio at a target by the dropping polymerizing method of the prior art.

Comparative Synthesis Example 1

Production target composition ratio: G/M/O=40/40/20
A copolymer was produced by the following procedures using three types of monomers G, M and O, with a composition ratio (molar ratio) of monomers to be supplied being G/M/O=39/42/19.
Methyl ethyl ketone (MEK) 590 g, monomer G (γ-butyrolactone methacrylate) 159 g, monomer M (2-methyl-2-adamantyl methacrylate) 236 g, and monomer O (3-hydroxy-1-adamantyl methacrylate) 108 g were added in a container and dissolved to prepare a uniform monomer solution. MEK 150 g, and MAIB (dimethyl-2,2'-azobis(isobutyrate))) 28 g were dissolved in another container to prepared a uniform polymerization initiator solution.
After feeding MEK 300 g in a 2 L four-mouth flask reactor made by Pyrex and converting to nitrogen atmosphere, it was heated to a temperature of 79° C. The monomer solution and the initiator solution maintained at room temperature (about 25° C.) was separately dropped into the reactor, which was kept at 79 to 81° C., over 4 hours using a quantitative pump at a constant rate. After the end of dropping, the reaction mixture was allowed to mature for 2 hours, while keeping the temperature at 79 to 81° C. And the mixture was allowed to cool to room temperature and then taken out. The reaction mixture was sampled for the analysis by LC every 30 minutes until 1 hour after the start, and thereafter every 60 minutes. The measurement results of the change with time of an unreacted monomer composition ratio and polymer concentration are shown in Table 1 and FIG. 1. The standard deviation (positive square root of unbiased variance) in the table shows the standard deviation of the unreacted monomer composition ratio at one hour interval by the 4th hour after the start of the polymerization reaction. In the present invention, the standard deviation can be determined by the following equation (1). In the present invention, each measured value at 0, 1st, 2nd, 3rd, and 4th hour was used (n=5). When the time from the start of the polymerization-reaction to the end of the supply is changes, the value of n can also be changed. Each measured value is preferably a value measured at an equal interval of time.

[Equation 1]

$$S = \{\Sigma(x_i - x_A)^2 / (n-1)\}^{1/2} \quad \text{Equation (1)}$$

S: Standard deviation
n: The number of measurement
$x_i$: Each measured value (monomer ratio) (i: 1 to n),
$x_A$: Average value of each measurement From the measurement results, it is seen the unreacted monomer composition ratio is stable in the 2nd to 4th hour after the start of the reaction. The unreacted monomer composition ratio at the time of stability in the middle stage was G/M/O=32/50/18.

The solution of the copolymer was reprecipitated in a solvent mixture of methanol and water. The generated resin powder was filtered and removed the unreacted monomers and the like. Furthermore, the resin powder was washed with methanol.

The resin powder was dried at 50° C. under reduced pressure, thereby obtaining a dried resin powder. The obtained resin was analyzed by the above-mentioned examination method. The results of the analysis were as follows:

Molecular weight (GPC): Mw=8700, Mw/Mn=1.85
Composition ($^{13}$C-NMR): G/M/O=40/40/20.

Furthermore, the composition and yield of the copolymer generated within a fixed amount of time after the start of supplying of the monomer solution are shown in Table 2. Here, a reduced amount of the monomer due to consumption by the reaction was considered to be entirely incorporated into the copolymer and then the composition of the generated copolymer was calculated. It is seen that the copolymer with the composition greatly biased from the production target composition ratio was generated in the initial stage of the start of supplying.

TABLE 1

| Time elapsed after the start of supplying | Unreacted monomer composition ratio (%) | | |
|---|---|---|---|
| (Hour) | G | M | O |
| 0 | 39.0 | 42.0 | 19.0 |
| 0.5 | 37.2 | 44.4 | 18.7 |
| 1 | 35.1 | 46.6 | 18.3 |
| 2 | 33.0 | 48.8 | 18.2 |
| 3 | 31.9 | 49.9 | 18.2 |
| 4 | 31.3 | 50.7 | 18.0 |
| 5 | 19.2 | 62.8 | 18.0 |
| 6 | 16.8 | 67.3 | 17.4 |
| Standard deviation | 3.12 | 3.49 | 0.38 |

TABLE 2

| Time elapsed after the start of supplying | Composition (%) and yield (%) of the copolymer generated in a given period of time | | | |
|---|---|---|---|---|
| (Hour) | G | M | O | Yield |
| 0 to 0.5 | 49.4 | 32.1 | 18.4 | 2.4 |
| 0.5 to 1 | 42.9 | 36.8 | 20.3 | 8.3 |
| 1 to 2 | 40.4 | 40.5 | 19.1 | 24.3 |
| 2 to 3 | 40.4 | 40.5 | 19.1 | 22.8 |
| 3 to 4 | 39.1 | 41.9 | 19.0 | 26.4 |
| 4 to 5 | 39.0 | 42.9 | 18.1 | 9.7 |
| 5 to 6 | 31.1 | 47.1 | 21.8 | 1.2 |

Comparative Synthesis Example 2

Production Target Composition of G/Ma/Oa=41/39/20

A copolymer was produced by the following procedures using three types of monomers G, Ma, and Oa, with a composition ratio (molar ratio) of monomers to be supplied being G/Ma/Oa=38/42/20.

Methyl ethyl ketone (MEK) 561 g, monomer G (γ-butyrolactone methacrylate) 155 g, monomer Ma (2-methyl-2-adamantyl acrylate) 222 g, and monomer Oa (3-hydroxy-1-adamantyl acrylate) 107 g were added in a container and dissolved to prepare a uniform monomer solution. MEK 150 g and MAIB 17 g were dissolved in another container to prepare a uniform initiator solution.

Figure 2:
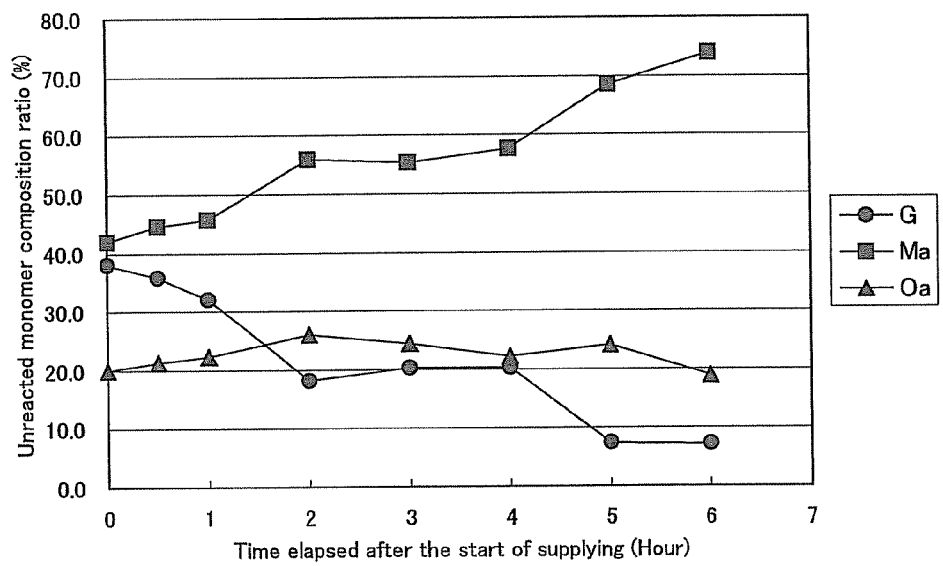
FIG. 2 is a figure showing the change with time of the unreacted monomer composition ratio in the polymerization reaction system in Comparative Synthesis Example 2.

Polymerization reaction and analysis of reaction solution were carried out in the same manner as described in Comparison Synthesis Example 1. The measurement results of the change with time of an unreacted monomer composition ratio shown in Table 3 and FIG. 2. The standard deviation in the table shows the standard deviation of the unreacted monomer composition ratio at one hour interval until the 4th hour after the start of the polymerization reaction. It is seen the unreacted monomer composition ratio is stable in the 2nd to 4th hour. The unreacted monomer composition ratio at the time of stability in the middle stage (from 2nd to 4th hour) was G/Ma/Oa=20/56/24 on average.

The solution of the copolymer was reprecipitated in n-hexane and the generated resin powder was filtered and removed the unreacted monomers and the like. Furthermore, the resin powder was washed with a MEK/hexane solvent mixture.

The resin powder was dried at 50° C. under reduced pressure, thereby obtaining a dried resin powder. The obtained resin was analyzed by the above-mentioned examination method. The results were as follows:

Molecular weight (GPC): Mw=10500, Mw/Mn=2.10
Composition ($^{13}$C-NMR): G/Ma/Oa=41/39/20

Furthermore, the composition and yield of the copolymer which was generated within a fixed amount of time after the start of supplying of the monomer solution are shown in Table 4. It is seen that the copolymer with the composition greatly biased from the production target composition ratio is generated in the initial stage of the start of supplying.

TABLE 3

| Time elapsed after the start of supplying | Unreacted monomer composition ratio (%) | | |
|---|---|---|---|
| (Hour) | G | Ma | Oa |
| 0 | 38.0 | 42.0 | 20.0 |
| 0.5 | 35.8 | 44.6 | 21.3 |
| 1 | 32.0 | 45.7 | 22.3 |
| 2 | 18.2 | 55.9 | 26.0 |

TABLE 3-continued

| Time elapsed after the start of supplying | Unreacted monomer composition ratio (%) | | |
|---|---|---|---|
| (Hour) | G | Ma | Oa |
| 3 | 20.3 | 55.3 | 24.4 |
| 4 | 20.2 | 57.6 | 22.2 |
| 5 | 7.4 | 68.5 | 24.1 |
| 6 | 7.3 | 73.8 | 18.9 |
| Standard deviation | 8.76 | 6.98 | 2.30 |

TABLE 4

| Time elapsed after the start of supplying | Composition (%) and yield (%) of the copolymer generated in a given period of time | | | |
|---|---|---|---|---|
| (Hour) | G | Ma | Oa | Yield |
| 0 to 0.5 | 56.6 | 30.6 | 12.8 | 1.1 |
| 0.5 to 1 | 43.5 | 38.2 | 17.5 | 14.3 |
| 1 to 2 | 41.9 | 39.0 | 19.1 | 21.9 |
| 2 to 3 | 38.0 | 41.5 | 20.5 | 23.6 |
| 3 to 4 | 38.8 | 40.1 | 21.1 | 24.0 |
| 4 to 5 | 27.3 | 51.6 | 21.1 | 9.3 |
| 5 to 6 | 7.7 | 60.3 | 32.0 | 2.0 |

Example 1

Production target composition ratio: G/M/O=40/40/20
Monomer solution (I) composition ratio: G/M/O=32/50/18
Monomer solution (II) composition ratio: G/M/O=40/40/20

Based on Comparative Synthesis Example 1, the composition ratios were determined as described above and a copolymer was produced by the following procedures.

MEK 84 g, monomer G 18.4 g, monomer M 39.6 g, and monomer O 14.4 g were added in a container and dissolved to prepare a uniform monomer solution (I). Also, MEK 506 g, monomer G 138.0 g, monomer M 190.3 g, and monomer O 96.0 g were added in another container and dissolved to prepare a uniform monomer solution (II). Further, MEK 150 g and MAIB 28 g were dissolved in another container to prepare a uniform polymerization initiator solution. The ratio of the amount of the monomer between the monomer solution (I) and monomer solution (II) was set to 1/7. The ratio of the volume of the solution was also set to about 1/7.

After feeding MEK 300 g in a 2 L four mouth flask reactor made by Pyrex and converting to nitrogen atmosphere, it was heated to a temperature of 79° C. The monomer solution (I) and initiator solution maintained at room temperature (about 25° C.) were separately started dropping using metering pumps. The flow rate of the initiator solution was adjusted such that the supplying of the initiator solution was over in 4 hours. The supplying of the monomer solution (I) was finished in 30 minutes. Thereafter, the pump was promptly replaced to the monomer solution (II) and the monomer solution (II) was supplied over 3 hours 30 minutes. During this period, the temperature in the reactor was kept at 79~81° C. The reaction solution was sampled for the analysis every 30 minutes until 1 hour after the start, and thereafter every 60 minutes. After the end of supplying all the monomer solution (II), the reactor was taken out of an oil bath and immersed in a water bath to be allowed to cool to room temperature.

Figure 3:
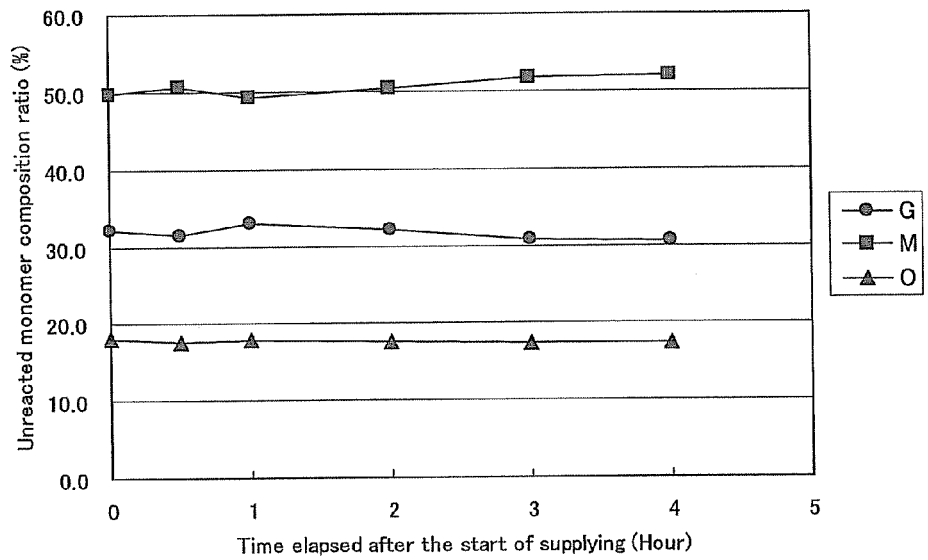
FIG. 3 is a figure showing the change with time of the unreacted monomer composition ratio in the polymerization reaction system in Example 1.

The measurement results of the change with time of an unreacted monomer composition ratio are shown in Table 5 and FIG. 3. The standard deviation in the table shows a standard deviation of the unreacted monomer composition ratio at one hour interval until the 4th hour after the start of the polymerization reaction. Compared with Comparative Synthesis Example 1, it was confirmed that the margin of fluctuation of the unreacted monomer composition ratio was significantly narrow. Throughout the entire time from the initial to final stage, the margin of fluctuation of the unreacted monomer composition ratio was within 4%, based on the initial monomer composition ratio of G/M/O=32/50/18.

The solution of the copolymer was reprecipitated in a solvent mixture of methanol and water and the generated resin powder was filtered to remove the unreacted monomer and the like. Furthermore, the resin powder was washed with methanol.

The resin powder was dried at 50° C. under reduced pressure, thereby obtaining a dried resin powder. The obtained resin was analyzed by the above-mentioned examination method. The results of the analysis were as follows:
Molecular weight (GPC): Mw=8800, Mw/Mn=1.85
Composition ($^{13}$C-NMR): G/M/O=40/40/20.

Furthermore, the composition and yield of the copolymer generated within a fixed amount of time after the start of supplying of the monomer solution are shown in Table 6. Compared with Comparative Synthesis Example 1, it is seen that the copolymer with a less biased composition from the production target composition ratio is generated even in the initial stage of the start of supplying.

TABLE 5

| Time elapsed after the start of supplying | Unreacted monomer composition ratio (%) | | |
|---|---|---|---|
| (Hour) | G | M | O |
| 0 | 32.1 | 49.8 | 18.1 |
| 0.5 | 31.5 | 50.7 | 17.7 |
| 1 | 33.0 | 49.2 | 17.8 |
| 2 | 32.1 | 50.4 | 17.5 |
| 3 | 30.8 | 51.8 | 17.4 |
| 4 | 30.7 | 52.0 | 17.4 |
| Standard deviation | 0.98 | 1.23 | 0.30 |

TABLE 6

| Time elapsed after the start of supplying | Composition (%) and yield (%) of the copolymer generated in a given period of time | | | |
|---|---|---|---|---|
| (Hour) | G | M | O | Yield |
| 0 to 0.5 | 35.6 | 44.2 | 20.2 | 1.8 |
| 0.5 to 1 | 39.6 | 40.5 | 20.0 | 19.7 |
| 1 to 2 | 40.3 | 39.9 | 19.8 | 23.5 |
| 2 to 3 | 40.0 | 40.4 | 19.5 | 25.4 |
| 3 to 4 | 39.7 | 40.7 | 19.6 | 24.3 |

Example 2

Production target composition ratio: G/Ma/Oa=41/39/20
Monomer solution (I) composition ratio: G/Ma/Oa=20/56/24
Monomer solution (II) composition ratio: G/Ma/Oa=41/39/20

Based on Comparative Synthesis Example 2, the composition ratios were determined as described above and a copolymer was produced by the following procedures.

MEK 53.6 g, monomer G 7.3 g, monomer Ma 26.6 g, and monomer Oa 11.5 g were added in a container and dissolved to prepare a uniform monomer solution (I). Also, MEK 536.4 g, monomer G 150.2 g, monomer Ma 197.5 g, and monomer Oa 101.9 g were added in another container and dissolved to prepare a uniform monomer solution (II). Further, MEK 150 g and MAIB 17 g were dissolved in another container to prepare a uniform polymerization initiator solution. The ratio of the amount of the monomer between the monomer solution (I) and monomer solution (II) was set to 1/11. The ratio of the volume of the solution was also set to about 1/11.

After feeding MEK 300 g in a 2 L four mouth flask reactor made by Pyrex and converting to nitrogen atmosphere, it was heated to a temperature of 79° C. The monomer solution and initiator solution maintained at room temperature (about 25° C.) were separately started dropping using metering pumps. The flow rate of the initiator solution was adjusted such that the supplying of the initiator solution was over in 4 hours. The supplying of the monomer solution (I) was finished in 20 minutes. Thereafter, the pump was promptly replaced to the monomer solution (II) and the monomer solution (II) was supplied over 3 hours 40 minutes. During this period, the temperature in the reactor was kept at 79~81° C. The reaction solution was sampled for the analysis every 30 minutes until 1 hour after the start, and thereafter every 60 minutes. After the end of supplying all the monomer solution (II), the reactor was taken out of an oil bath and immersed in a water bath to be allowed to cool to room temperature.

Figure 4:
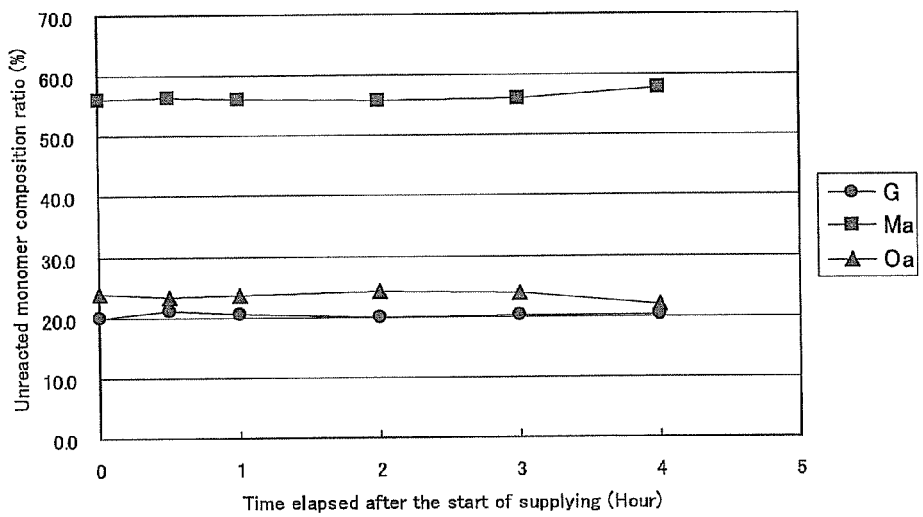
FIG. 4 is a figure showing the change with time of the unreacted monomer composition ratio in the polymerization reaction system in Example 2.

The measurement results of the change with time of an unreacted monomer composition ratio are shown in Table 7 and FIG. 4. The standard deviation in the table shows a standard deviation of the unreacted monomer composition ratio at one hour interval until the 4th hour after the start of the polymerization reaction. Compared with Comparative Synthesis Example 2, it was confirmed that the margin of fluctuation of the unreacted monomer composition ratio was significantly narrow. Throughout the entire time from the initial to final stage, the margin of fluctuation of the unreacted monomer composition ratio was within 6%, based on the initial monomer composition ratio of G/Ma/Oa=20/56/24.

The solution of the copolymer was reprecipitated in n-hexane and the generated resin powder was filtered to remove the unreacted monomer and the like. Furthermore, the resin powder was washed with MEK/hexane solvent mixture.

The resin powder was dried at 50° C. under reduced pressure, thereby obtaining a dried resin powder. The obtained resin was analyzed by the above-mentioned examination method. The results of the analysis were as follows:
Molecular weight (GPC): Mw=10600, Mw/Mn=2.10
Composition ($^{13}$C-NMR): G/Ma/Oa=41/39/20.

Furthermore, the composition and yield of the copolymer generated within a fixed amount of time after the start of supplying of the monomer solution are shown in Table 8. Compared with Comparative Synthesis Example 2, it is seen that the copolymer with a less biased composition from the production target composition ratio is generated even in the initial stage of the start of supplying.

TABLE 7

| Time elapsed after the start of supplying | Unreacted monomer composition ratio (%) | | |
|---|---|---|---|
| (Hour) | G | Ma | Oa |
| 0 | 20.0 | 56.0 | 24.0 |
| 0.5 | 21.1 | 56.4 | 23.2 |
| 1 | 20.5 | 56.0 | 23.5 |
| 2 | 19.9 | 55.8 | 24.3 |
| 3 | 20.2 | 56.0 | 23.8 |
| 4 | 20.2 | 57.8 | 22.0 |
| Standard deviation | 0.23 | 0.83 | 0.90 |

TABLE 8

| Time elapsed after the start of supplying | Composition (%) and yield (%) of the copolymer generated in a given period of time | | | |
|---|---|---|---|---|
| (Hour) | G | Ma | Oa | Yield |
| 0 to 0.5 | 45.7 | 34.7 | 19.6 | 1.2 |
| 0.5 to 1 | 39.9 | 39.8 | 20.4 | 14.5 |
| 1 to 2 | 40.4 | 39.9 | 19.7 | 27.3 |
| 2 to 3 | 40.5 | 39.1 | 20.4 | 25.4 |
| 3 to 4 | 39.7 | 39.2 | 21.1 | 26.6 |

The invention claimed is:

1. A method for production of a copolymer for photoresists, said copolymer containing at least two types of repeating units, said method comprising a supplying step of supplying a monomer solution and a solution containing a polymerization initiator into a polymerization reaction system, wherein the range of fluctuation of the monomer composition ratio of unreacted monomers is within the range between minus 15% and plus 5% in said polymerization reaction system during the period from the start of the polymerization reaction to the end of supplying of said monomer solution, and wherein the monomer composition ratio of said monomer solution at the start of supplying in said supplying step and/or the monomer composition ratio of said monomer solution fed in said polymerization reaction system in advance is determined by the procedures of said polymerization reaction comprising the following procedures (a) to (d):

(a) supplying said monomer solution having a monomer composition ratio (II) identical or nearly identical to a production target composition ratio (X), and said solution containing said polymerization initiator into said polymerization reaction system, (b) measuring change with time of the composition ratio of said unreacted monomers in said polymerization reaction system, (c) determining a monomer composition ratio when said composition ratio measured in the procedure (b) is constant or nearly constant, and (d) employing the monomer composition ratio (I) determined in the procedure (c) as the monomer composition ratio of said monomer solution at the start of supplying in the above-mentioned supplying step, the monomer composition ratio of said monomer solution fed in said polymerization reaction system in advance.

2. The method for production according to claim 1, wherein the range of fluctuation of the monomer composition ratio of said unreacted monomers is within the range between minus 7% and plus 7% in said polymerization reaction system during the period from the point of the termination of supplying 1/6 to 1/3 of the total weight of said monomer solution to be supplied to the end of supplying.

3. The method for production according to claim 1, wherein said monomer composition ratio (I) is the composition ratio at which said monomers are consumed at said monomer composition ratio (II) in said polymerization reaction system.

4. The method for production according to claim 1, wherein the monomer composition ratio of said monomer solution to be supplied is changed stepwise or continuously in said supplying step.

5. The method for production according to claim 1, wherein the monomer composition ratio of said monomer solution to be supplied is changed from said monomer composition ratio (I) to said monomer composition ratio (II) stepwise or continuously in said supplying step.

6. The method for production according to claim 5, wherein the weight ratio of the amount of the supply of said monomer solution with said monomer composition ratio (I) to the amount of the supply of said monomer solution with said monomer composition ratio (II) is 1:3 to 1:30.

7. The method for production according to claim 1, wherein said monomer composition ratio is changed stepwise or continuously after supplying 1/30 to 1/3 of the total weight of said monomer solution to be supplied.

8. The method for production according to claim 1, further comprising the step of terminating said polymerization reaction by cooling or adding a heavy metal after supplying the entire amount of said monomer solution.

9. The method for production according to claim 1, wherein said copolymer comprises at least two types of repeating units selected from the group consisting of: a repeating unit (A) which is rendered alkali soluble by an acid; a repeating unit (B) having a polar group-containing alicyclic group; a repeating unit (C) having a lactone structure; a repeating unit (D) having a cyclic ether structure; and a repeating unit (E) having an acid stable dissolution-inhibiting structure.

10. The method for production according to claim 9, wherein said repeating unit (A) is a repeating unit having at least one selected from the group consisting of alkyl adamantanes, alkyl polycyclic hydrocarbons, and 1-alkyl-substituted (cycloalkyl) groups.

11. The method for production according to claim 9, wherein said repeating unit (B) is a repeating unit having an alicyclic hydrocarbon having at least one functional group selected from the group consisting of hydroxyl group, carboxyl group, fluoro alcohol groups, and cyano group.

12. The method for production according to claim 9, wherein said repeating unit (E) is repeating unit having a hydrocarbon group of the carbon numbers 1 to 12 whose carbon substituted to the hydrogen atom of a hydroxyl group and bound to an oxygen atom is a primary to tertiary carbon, or repeating unit having a structure which a 1-adamantyl group substituted to a hydrogen atom of hydroxyl group.

13. The method for production according to claim 1, wherein a polymerization reaction apparatus having at least one feeder for said monomer solution and at least one feeder for said solution containing said polymerization initiator is used.

\* \* \* \* \*

UNITED STATES PATENT AND TRADEMARK OFFICE
CERTIFICATE OF CORRECTION

PATENT NO. : 8,455,596 B2
APPLICATION NO. : 12/702356
DATED : June 4, 2013
INVENTOR(S) : Tomo Oikawa and Eiichi Ikawa It is certified that error appears in the above-identified patent and that said Letters Patent is hereby corrected as shown below:

In the Claims:

Column 37, line 21: Please change "minus 15% and plus 5%" to -- minus 15% and plus 15% --

Column 37, line 46: Please change "step, the monomer" to -- step, and/or the monomer --

Signed and Sealed this
Seventeenth Day of September, 2013

Teresa Stanek Rea
*Deputy Director of the United States Patent and Trademark Office*